(12) United States Patent
Bin Sediq et al.

(10) Patent No.: US 10,644,925 B2
(45) Date of Patent: May 5, 2020

(54) CONTROL DATA TRANSMISSION SCHEME

(71) Applicants: Akram Bin Sediq, Kanata (CA); Talha Ahmad, Kanata (CA); Ahmed Nouah, Ottawa (CA); Hua Xu, Ottawa (CA)

(72) Inventors: Akram Bin Sediq, Kanata (CA); Talha Ahmad, Kanata (CA); Ahmed Nouah, Ottawa (CA); Hua Xu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/308,070

(22) PCT Filed: Jun. 14, 2016

(86) PCT No.: PCT/IB2016/053499
§ 371 (c)(1),
(2) Date: Dec. 7, 2018

(87) PCT Pub. No.: WO2017/216605
PCT Pub. Date: Dec. 21, 2017

(65) Prior Publication Data
US 2019/0182096 A1    Jun. 13, 2019

(51) Int. Cl.
*H04L 27/34*      (2006.01)
*H04L 1/00*       (2006.01)
(Continued)

(52) U.S. Cl.
CPC ........ *H04L 27/3488* (2013.01); *H04L 1/0004* (2013.01); *H04L 1/0038* (2013.01);
(Continued)

(58) Field of Classification Search
CPC . H04L 27/3488; H04L 1/0004; H04L 1/0038; H04L 27/389; H04L 1/0041;
(Continued)

(56) References Cited

U.S. PATENT DOCUMENTS

2008/0280630 A1    11/2008  Kalhan et al.
2011/0200004 A1*   8/2011   Nakashima ......... H04J 13/0062
                                                    370/330
(Continued)

FOREIGN PATENT DOCUMENTS

EP        1 531 560 A1      5/2005

OTHER PUBLICATIONS

3GPP TS 36.212 v8.7.0; Technical Specification; 3rd Generation Partnership Project; Technical Specification Group Radio Access Network; Evolved Universal Terrestrial Radio Access (E-UTRA); Multiplexing and Channel Coding (Release 8)—May 2009.
(Continued)

*Primary Examiner* — Vineeta S Panwalkar
(74) *Attorney, Agent, or Firm* — Sage Patent Group

(57) ABSTRACT

A transmission scheme for transmitting control data segments over a control channel using multi-layer or hierarchical modulation is disclosed. According to principles described herein, first and second control data segments are modulated to form multi-layer symbols configured such that the first control data segment is recoverable via demodulation at a lower order while a second control data segment is recoverable via demodulation at a higher order. In at least some embodiments, the scheme dynamically adapts this higher order to current channel conditions so as to maximize the control channel's spectral efficiency, while at the same time still allowing the system to statically fix the modulation order for the first control data segment, e.g., to maintain (blind) decoding complexity. By transmitting control data in segments using multi-layer modulation, spectral efficiency of the control channel may be improved.

22 Claims, 14 Drawing Sheets

(51) Int. Cl.
*H04L 27/38* (2006.01)
*H04W 72/04* (2009.01)

(52) U.S. Cl.
CPC .......... *H04L 1/0041* (2013.01); *H04L 1/0061* (2013.01); *H04L 27/389* (2013.01); *H04W 72/042* (2013.01); *H04L 1/0013* (2013.01); *H04L 27/34* (2013.01)

(58) Field of Classification Search
CPC ..... H04L 1/0061; H04L 1/0013; H04L 27/34; H04W 72/042
See application file for complete search history.

(56) References Cited

U.S. PATENT DOCUMENTS

| | | |
|---|---|---|
| 2013/0003663 A1 | 1/2013 | Blankenship et al. |
| 2013/0343307 A1* | 12/2013 | Desai .................... H04W 74/04 370/329 |
| 2015/0319021 A1 | 11/2015 | Xue et al. |

OTHER PUBLICATIONS

PCT International Search Report for International application No. PCT/IB2016/053499—dated Mar. 13, 2017.
PCT Written Opinion of the International Searching Authority for International application No. PCT/IB2016/053499—dated Mar. 13, 2017.

* cited by examiner

Legend: xx|yy
xx: First control data segment bits
yyyy: second control data segment bits

ONE OFDM SYMBOL INCLUDING CYCLIC PREFIX

US 10,644,925 B2

CONTROL DATA TRANSMISSION SCHEME

PRIORITY

This nonprovisional application is a U.S. National Stage Filing under 35 U.S.C. § 371 of International Patent Application Serial No. PCT/IB2016/053499 filed Jun. 14, 2016, and entitled "CONTROL DATA TRANSMISSION SCHEME" which is hereby incorporated by reference in its entirety.

TECHNICAL FIELD

The present disclosure generally relates to transmissions to a wireless communication device, and particularly relates to transmitting control data to a wireless communication device over a control channel.

BACKGROUND

A wireless communication system defines different channels over which to transmit data between a radio network node and a wireless communication device. Different types of channels carry different types of data. For example, a data channel carries user data, and a control channel carries control data. Because the control data supports transmission of the user data over the data channel, the control data proves important enough to transmit with as low a modulation order as necessary to guarantee robustness against noise and interference.

In at least some contexts, though, practical constraints prevent the system from dynamically adapting the control channel's modulation order to current channel conditions. This effectively requires the system to statically fix the control channel's modulation order to the most robust option, and thereby artificially cap the control channel's spectral efficiency even in the presence of favorable channel conditions. With the control channel's spectral efficiency limited in this way, the control channel requires more transmission resources than would otherwise be required.

Consider for instance a Physical Downlink Control Channel (PDCCH) in a system that is or evolves from Long Term Evolution (LTE). A PDCCH is a physical channel that carries control data called Downlink Control Information (DCI). This DCI among other things supports transmission of user data over the Physical Downlink Shared Channel (PDSCH). The DCI in this regard informs a user equipment (UE) about the location of the physical resource block pairs allocated to it in the PDSCH, as well as the modulation scheme that the UE needs to use for recovering its user data on the PDSCH. Although the PDCCH signals the PDSCH's modulation order, there is no mechanism to signal the modulation order of the PDCCH itself. In addition, requiring the UE to blindly detect that modulation order would unacceptably increase the UE's complexity. As a result, the PDCCH's modulation scheme remains fixed as Quadrature Phase-Shift Keying (QPSK). With the PDCCH's modulation order thereby fixed at the most robust order of 4, the maximum spectral efficiency for the PDCCH is always less than 2 bits/sec/Hz, even for UEs with the most favorable channel conditions. Similar challenges exist for the enhanced PDCCH (ePDCCH) as another example.

SUMMARY

A transmission scheme for transmitting control data segments over a control channel using multi-layer or hierarchical modulation is disclosed. According to principles described herein, first and second control data segments are modulated to form multi-layer symbols configured such that the first control data segment is recoverable via demodulation at a lower order while a second control data segment is recoverable via demodulation at a higher order. In at least some embodiments, the scheme dynamically adapts this higher order to current channel conditions so as to maximize the control channel's spectral efficiency, while at the same time still allowing the system to statically fix the modulation order for the first control data segment, e.g., to maintain (blind) decoding complexity. By transmitting control data in segments using multi-layer modulation, spectral efficiency of the control channel may be improved.

In one broad aspect, there is provided a method implemented by radio network node for transmitting control data to a wireless communication device in a wireless communication system that includes a control channel over which control data is transmitted. The method includes generating first and second control data segments for the wireless communication device with the first control data segment including an error detection code generated based on an identifier of the wireless communication device. The method further includes modulating the first and second control data segments to form one or more multi-layer symbols with a first layer conveying the first control data segment and a second layer conveying the second control data segment and where the first layer is recoverable via demodulation at a first order and the second layer is recoverable via demodulation at a second order higher than the first order. The method also includes transmitting the one or more multi-layer symbols to the wireless communication device over the control channel.

In some node embodiments, generating the first and second control data segment includes segmenting a control data message intended for the wireless communication device to produce the first and second control data segments. In other node embodiments, prior to the modulating, the method further includes encoding each of the first and second control data segments independently and concatenating the first control data segment with the second control data segment.

In yet other node embodiments, the error detection code included in the first control data segment is generated based on the first control data segment but not based on the second control data segment to enable blind decoding attempts by devices configured for demodulation at the first order and by devices configured for demodulation at the first and second orders. In yet other node embodiments the error detection code is a Cyclic Redundancy Check (CRC) code scrambled with a Radio Network Temporary Identifier (RNTI) of the wireless communication device, and/or the second control data segment includes a different error detection code.

In yet other node embodiments, the method further includes sending a modulation order indication to the wireless communication device indicating the second order. The modulation order may be sent included in the first control data segment or an upper layer signaling message.

In yet other node embodiments, the wireless communication system is or evolves from a Long Term Evolution, LTE, system, where the control channel is one of a Physical Downlink Control Channel (PDCCH) and an enhanced PDCCH (ePDCCH). In yet other node embodiments, the first and second control data segments are Downlink Control Information (DCI) segments, the first layer is recoverable via Quadrature Phase Shift Keying (QPSK) demodulation, and the second layer is recoverable via M-QAM demodulation, where M is greater than 4. In another broad aspect, there is provided a radio network node configured for transmitting control data to a wireless communication device in a wireless communication system that includes a control channel over which control data is transmitted. The radio network node includes circuitry containing instructions which, when executed, cause the radio network node to perform any of the node method embodiments described above.

In yet another broad aspect, there is provided a non-transitory computer readable memory configured to store executable instructions for a radio network node configured for transmitting control data to a wireless communication device in a wireless communication system that includes a control channel over which control data is transmitted. The executable instructions when executed by a processor cause the radio network node to perform any of the node method embodiments described above.

In yet another broad aspect, there is provided a radio network node configured for transmitting control data to a wireless communication device in a wireless communication system that includes a control channel over which control data is transmitted. The radio network node includes a transceiver, a processor and a memory containing a generating module configured to generate first and second control data segments for the wireless communication device with the first control data segment including an error detection code generated based on an identifier of the wireless communication device. The memory further contains a modulating module configured to modulate the first and second control data segments to form one or more multi-layer symbols with a first layer conveying the first control data segment and a second layer conveying the second control data segment and where the first layer is recoverable via demodulation at a first order and the second layer is recoverable via demodulation at a second order higher than the first order. The memory further contains a transmission module configured to transmit the one or more multi-layer symbols to the wireless communication device over the control channel.

In yet another broad aspect, there is provided a method implemented by a wireless communication device for receiving control data from a radio network node in a wireless communication system that includes a control channel over which control data is transmitted. The method includes receiving over the control channel one or more multi-layer symbols conveying a first control data segment in a first layer that is recoverable via demodulation at a first order and conveying a second control data segment in a second layer that is recoverable via demodulation at a second order, higher than the first order, in that method, the first control data segment includes an error detection code generated based on a device identifier. The method further includes demodulating the first layer at the first order to obtain first-order demodulated data, determining if the first-order demodulated data is intended for the wireless communication device based on an identifier of the wireless communication device, and if the first-order demodulated data is intended for the wireless communication device, recovering one or more of the first and second control data segments.

In some device embodiments, the recovering the second control data segment includes determining the second order from a received modulation order indication and demodulating the second layer at the second order based on the modulation order. In other device embodiments, recovering the second control data segment includes demodulating the second layer at the second order to obtain second-order demodulated data, and recovering the second control data segment from the second-order demodulated data. In yet other device embodiments, the method further includes concatenating the first and second control data segments recovered to form a control data message intended for the wireless communication device. In yet other device embodiments, the demodulating and determining is for an attempt to blindly decode the first-order demodulated data to recover the first control data segment based on the wireless communication device identifier.

In yet other device embodiments, the determining includes performing an error detection check of the first-order demodulated data based on the wireless communication device identifier. In yet other device embodiments, the error detection code included in the first control data segment is generated based on the first control data segment but not based on the second control data segment to enable blind decoding attempts by devices configured for demodulation at the first order and by devices configured for demodulation at the first and second orders. In yet other device embodiments, the error detection code is a CRC code scrambled with an RNTI of the wireless communication device. In yet other device embodiments, the second control data segment includes a different error detection code.

In yet other device embodiments, the method further includes receiving a modulation order indication from the radio network node indicating the second order. In yet other device embodiments, the modulation order indication is included in one of the first control data segment and an upper layer signaling message.

In yet other device embodiments, the wireless communication system is or evolves from an LTE system, where the control channel is one of a PDCCH and an ePDCCH, where the first and second control data segments are DCI segments, and/or where the first layer is recoverable via QPSK demodulation, and the second layer is recoverable via M-QAM demodulation, where M is greater than 4.

In another broad aspect, there is provided a wireless communication device configured to receive control data from a radio network node in a wireless communication system that includes a control channel over which control data is transmitted. The wireless communication device includes circuitry containing instructions which, when executed, cause the device to perform any of the device method embodiments described above.

In yet another broad aspect there is provided a non-transitory computer readable memory configured to store executable instructions for a wireless communication device configured to receive control data from a radio network node in a wireless communication system that includes a control channel over which control data is transmitted. The executable instructions when executed by a processor cause the wireless communication device to perform any of the device method embodiments described above.

In yet another broad aspect, there is provided a wireless communication device configured to receive control data from a radio network node in a wireless communication system that includes a control channel over which control data is transmitted. The wireless communication device includes a transceiver, a processor and a memory containing a receiving module configured to receive over the control channel one or more multi-layer symbols conveying a first control data segment in a first layer that is recoverable via demodulation at a first order and conveying a second control data segment in a second layer that is recoverable via demodulation at a second order, higher than the first order, where the first control data segment includes an error detection code generated based on a device identifier. The memory further contains a demodulating module configured to demodulate the first layer at the first order to obtain first-order demodulated data, a determining module configured to determine if the first-order demodulated data is intended for the wireless communication device based on an identifier of the wireless communication device and a recovering module configured to recover one or more of the first and second control data segments if the first-order demodulated data is intended for the wireless communication device.

In some embodiments, the first and second control data segments are encoded independently prior to being modulated such that the first control data segment can be decoded independently of the second control data segment (e.g. the first control data segment can be decoded without having to decode or without being configured for decoding the second control data segment). In other embodiments, the error detection code included in the first control data segment is independent of the second control data segment (e.g. corresponds to or is generated based on the first control data segment, not the second control data segment). The independent coding of the first and second control data segments and/or the use of an error correction code in the first control data segment that is independent of the second control data segment may be beneficial in embodiments where control data messages conveyed over the control channel must be blindly decoded at a low modulation order. Maintaining lower order demodulation for blind decoding attempts of control data messages not only preserves backwards compatibility with devices configured only to handle single-layer symbols (i.e. single-layer modulation devices) but also preserves lower blind decoding complexity for devices also capable of multi-layer symbols (i.e. multi-layer modulation devices) as multi-layer modulation devices may not be required to perform blind decoding for each possible modulation order.

In other embodiments, the use of multi-layer modulation may advantageously reduce the number of resource elements required. This in turn may increase the spectral efficiency of the control channel and for example, permit more devices to be scheduled and/or more control data to be transmitted in the same time interval (e.g. sub-frame).

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein.

DETAILED DESCRIPTION

Figure 1:
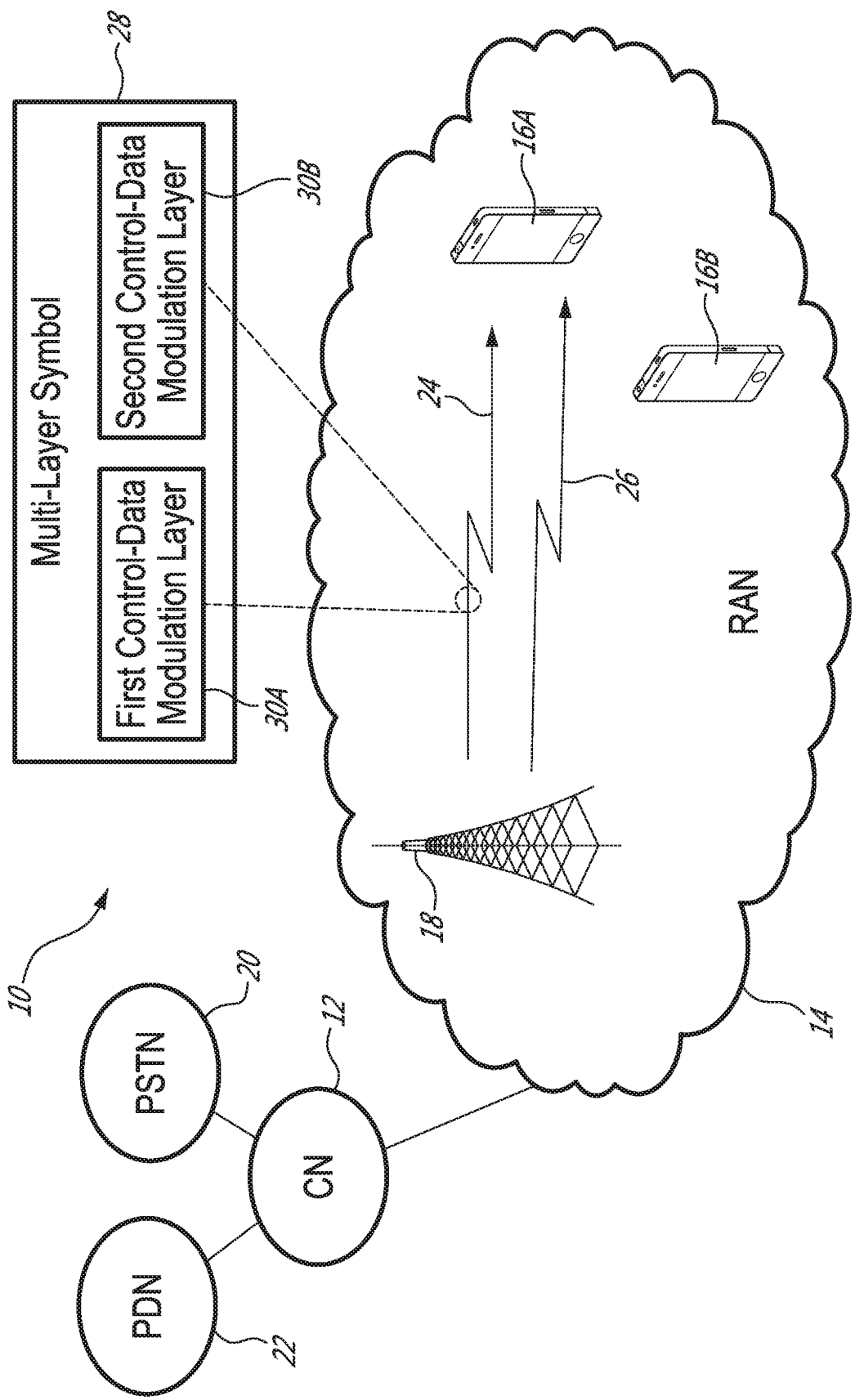
FIG. 1 is a block diagram of a wireless communication system according to one or more embodiments.

FIG. 1 depicts a wireless communication system 10 according to one or more embodiments herein. As shown, the system 10 includes a core network (CN) 12 as well as a radio access network (RAN) 14. The RAN 14 provides wireless communication devices 16 with radio access to the CN 12 via a plurality of radio network nodes 18, one of which is shown. The ON 12 in turn connects the wireless communication devices 16 to one or more external networks. The one or more external networks are shown as a public switched telephone network (PSTN) 20 and a packet data network (PDN) 22 such as the Internet.

The system 10 includes one or more data channels 26 (one of which is shown) over which user data is transmitted. The system 10 also includes one or more control channels 24 (one of which is shown) over which control data is transmitted. In some embodiments, the control and data channels 24, 26 are physical (PHY) layer channels. The data channel 26 may transport not only user data, but also control data or messages sent via a higher protocol (non-physical) layer i.e. a layer above the PHY layer e.g. a Medium Access Control (MAC) or Radio Resource Control (RRC) layer. This (upper layer) type of control data is transmitted on a time basis slower than a time basis on which (PHY layer) control data may be transmitted over the control channel 24. In at least some embodiments, the type of control data transmitted over a data channel 26 generally controls transmission of user data at a higher protocol layer (e.g. the RRC layer) whereas the type of control data transmitted over a control channel 24 generally controls transmission of user data at a lower protocol layer (e.g., the PHY layer). In at least some embodiments, the system 10 includes a data channel 26 over which different user data is conveyed for different users in a shared fashion, but includes multiple different control channels 24 that exclusively convey different control data for different individual devices 16. That is, in such embodiments, any control data conveyed on any given control channel 24 is exclusively addressed to one or a set of particular devices 16. In some embodiments where the system 10 is or evolves from Long Term Evolution (LTE), for example, the control channel 24 is a Physical Downlink Control Channel (PDCCH) or an enhanced PDCCH (ePDCCH), the data channel 26 is a Physical Downlink Shared Channel (PDSCH), the control data is Downlink Control Information (DCI), and the user data is PDSCH user data, e.g., from the Dedicated Traffic Channel (DTCH). Other possibilities exist for the control and data channels 24, 26.

According to principles of present disclosure, the radio network node 18 is configured to transmit control data as multiple control data segments modulated into one or more multi-layer symbols 28 using hierarchical or multi-layer modulation. Multi-layer modulation effectively performs modulation division multiplexing so as to multiplex different control data messages or segments onto different modulation or superposed layers (e.g., a QPSK layer and a 16-QAM layer) of the same modulation symbol. By multiplexing different control data segments onto the same symbol using multi-layer modulation, the radio network node 18 in some embodiments improves the control channel's spectral efficiency, yet still conforms to constraints imposed on transmission of the control data.

The control data can be generated as or segmented into multiple control data segments that are modulated onto different layers of the multi-layer symbols 28. In some embodiments (such as the example of FIG. 1), each of the multi-layer symbols 28 includes a first control-data modulation layer 30A conveying a first control data segment and a second control-data modulation layer 30B conveying a second control data segment. However it is understood that in other embodiments, a different number of segments (e.g. more than 2) could be used and modulated onto a different number of modulation layers (e.g. more than 2) of the multi-layer symbol(s) 28. Although the following examples are in relation to embodiments with two segments modulated onto two modulation layers, it is to be understood that the present disclosure is not limited as such.

Figure 2:
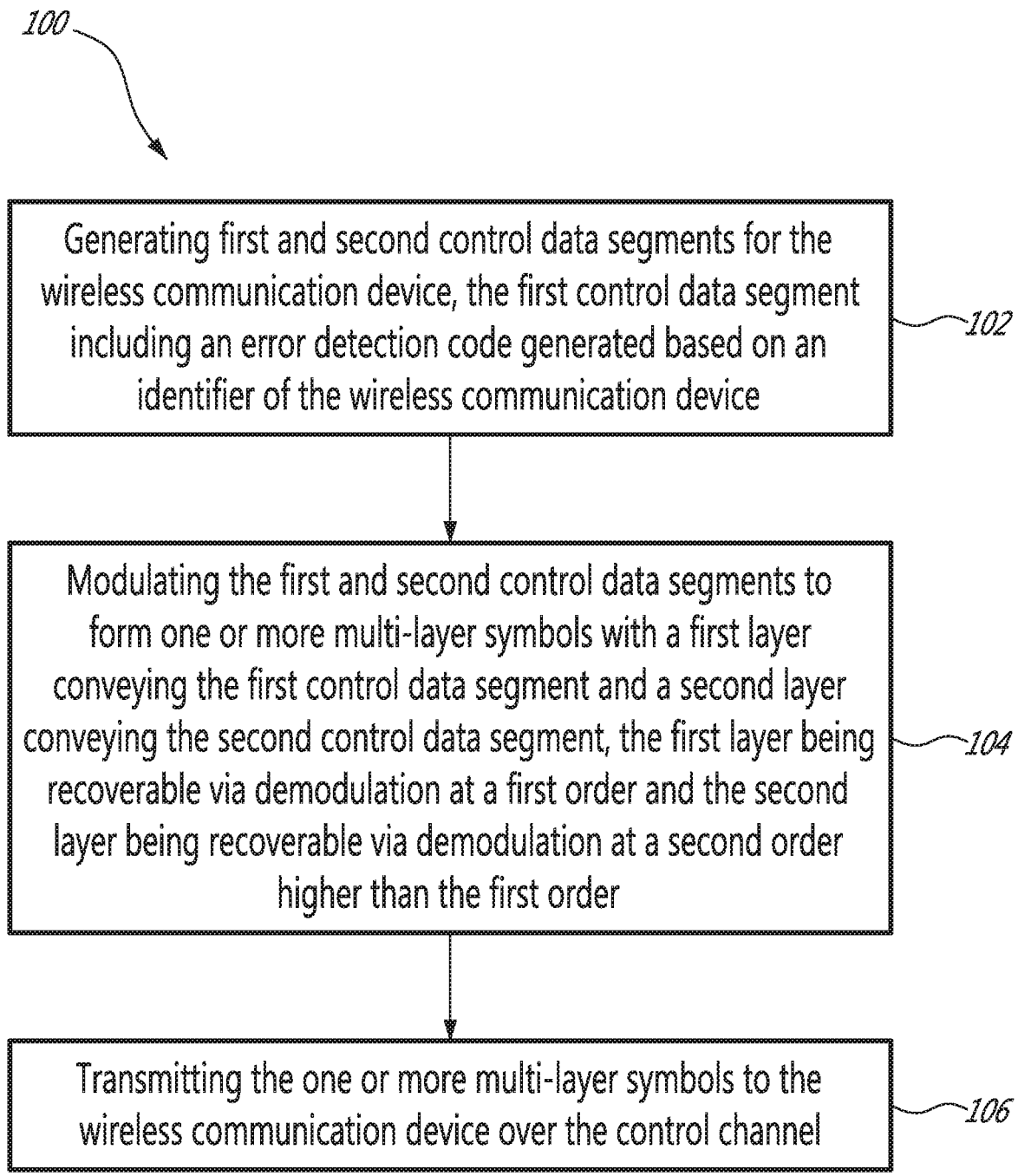
FIG. 2 is a logic flow diagram of a method implemented by a radio network node for transmitting control data to a wireless communication device according to one or more embodiments.

FIG. 2 is a logic flow diagram of an example method implemented by the radio network node 18 for transmitting control data to the wireless communication device 16A in the wireless communication system 10 that includes the control channel 24 over which control data is transmitted, according to one or more embodiments. The method begins with the node 18 generating first and second control data segments for the wireless communication device 16A where the first control data segment includes an error detection code generated based on an identifier of the wireless communication device (Block 102). The node 18 then modulates the first and second control data segments to form one or more multi-layer symbols (28) with a first layer that conveys the first control data segment and a second layer that conveys the second control data segment. The first layer is recoverable via demodulation at a first order while the second layer is recoverable via demodulation at a second order, higher than the first order (Block 104). The node 18 transmits the one or more multi-layer symbols (28) to the wireless communication device 16A over the control channel (24) (Block 106).

In some embodiments, prior to the modulating, the first and second control data segments are (channel) encoded independently such that the first control data segment can be decoded independently of the second data segment (e.g. the first control data can be decoded without having to decode or without being configured for decoding the second control data segment). In other embodiments, the error detection code included in the first control data segment is independent of the second control data segment (e.g.). In some of these embodiments, the independent coding and/or the use of a CRC in the first control data segment generated independently of (not based on) the second control segment may facilitate the blind decoding and recovery of the first control data segment via a lower modulation order (e.g. QPSK), irrespective of the presence of the second control data segment.

In some embodiments, for instance, the first and second layers include first and second control-data modulation layers 30A, 30B respectively. The first control-data modulation layer 30A and the first control data segment on that layer is recoverable via QPSK demodulation (i.e., an order of 4), but the second control-data modulation layer 30B and the second control data segment on that layer 30B is only recoverable via M-QAM demodulation, where M is greater than 4 (e.g., 16). Regardless, in some embodiments, the lower order is predefined independent of conditions on the control channel 24. That is, the radio network node 18 refrains from dynamically adapting the lower order based on control channel conditions at the device 16A, e.g., to ensure control data robustness and minimize control data decoding complexity. In other embodiments, the method further includes concatenating the first control data segments with the second control data segment prior to the modulating. In yet other embodiments, the error detection code is a cyclic redundancy check (CRC) scrambled with a Radio Network Temporary Identifier (RNTI) of the wireless communication device. The RNTI may be specific to the wireless communication device or may be common to a group of devices which includes the wireless communication device.

Figure 3:
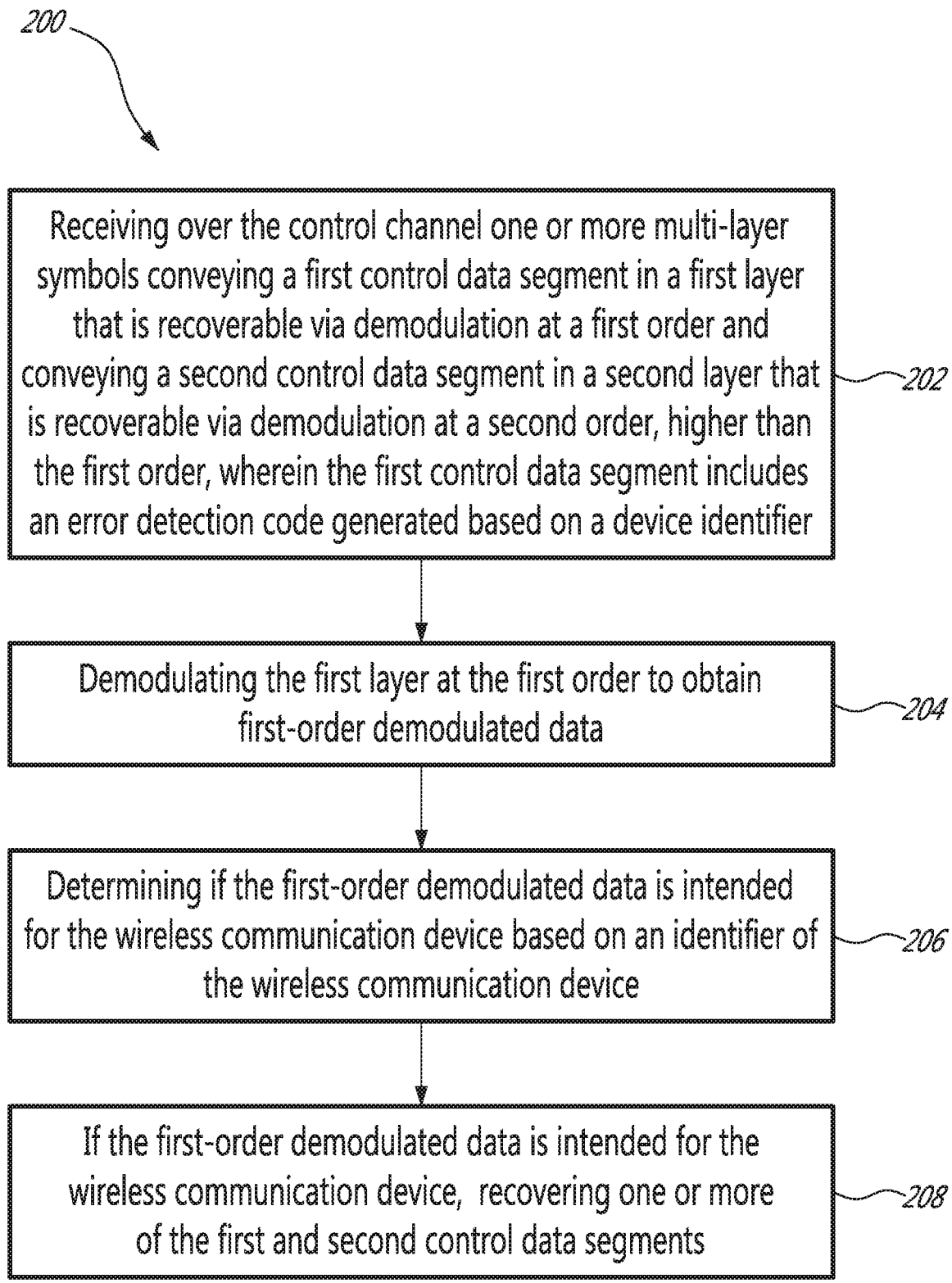
FIG. 3 is a logic flow diagram of a method implemented by a wireless communication device for receiving control data from a radio network node, according to one or more embodiments.

FIG. 3 is a logic flow diagram of an example method implemented by the wireless communication device 16A for receiving control data from the radio network node 18 in the wireless communication system 10 that includes the control channel 24 over which control data is transmitted, according to one or more embodiments. As shown, method begins with the wireless communication device 16A receiving over the control channel one or more multi-layer symbols 28 conveying a first control data segment in a first layer that is recoverable via demodulation at a first (modulation) order and conveying a second control data segment in a second layer that is recoverable via demodulation at a second (modulation) order, higher than the first order and where the first control data segment includes an error detection code generated based on a device identifier (Block 202). The wireless communication device 16A demodulates the first layer at the first (modulation) order to obtain first-order demodulated data (Block 204). The wireless communication device 16A then determines if the first-order demodulated data is intended for the wireless communication device 16A based on an identifier of the wireless communication device 16A (Block 206) and if the first-order demodulated data is intended for the wireless communication device 16A, the wireless communication device 16A recovers one or more of the first and second control data segments (Block 208).

In some embodiments, prior to the modulating, the first and second control data segments are (channel) encoded independently such that the first control data segment can be decoded independently of the second data segment (e.g. the first control data can be decoded without having to decode or without being configured for decoding the second control data segment). In other embodiments, the error detection code (e.g. CRC) included in the first control data segment is independent of the second control data segment (e.g. is generated based on the first control data segment but not based on the second control data segment). In some of these embodiments, the independent coding and/or the use of a CRC in the first control data segment generated independently of (not based on) the second control segment may facilitate the blind decoding and recovery of the first control data segment via a lower modulation order (e.g. QPSK), irrespective of the presence of the second control data segment.

In some embodiments, for instance, the first and second layers include first and second control-data modulation layers 30A, 30B respectively. The control data on the first control-data modulation layer 30A (i.e. the first control data segment) is recoverable via QPSK demodulation (i.e., a modulation order of 4), but the second control-data modulation layer 30B and the control data on that layer 30B (i.e. the second control data segment) is only recoverable via M-QAM demodulation, where M is greater than 4 (e.g., 16). In other embodiments, the error detection code is a CRC code, the device identifier is a Radio Network Temporary Identifier (RNTI) and the wireless communication device identifier is an RNTI of the wireless communication device which may be specific to the wireless communication device or common to a group of devices which includes the wireless communication device. In yet other embodiments, the wireless communication device determines that the first-order demodulated data is intended for the wireless communication device if the CRC check based on the device's RNTI is successful. If successful, the wireless communication device determines a modulation order from a received modulation order indication, demodulates the second layer at the second order based on the modulation order and concatenates the first and second control data segments to form a control data message intended for the wireless communication device.

Figure 4:
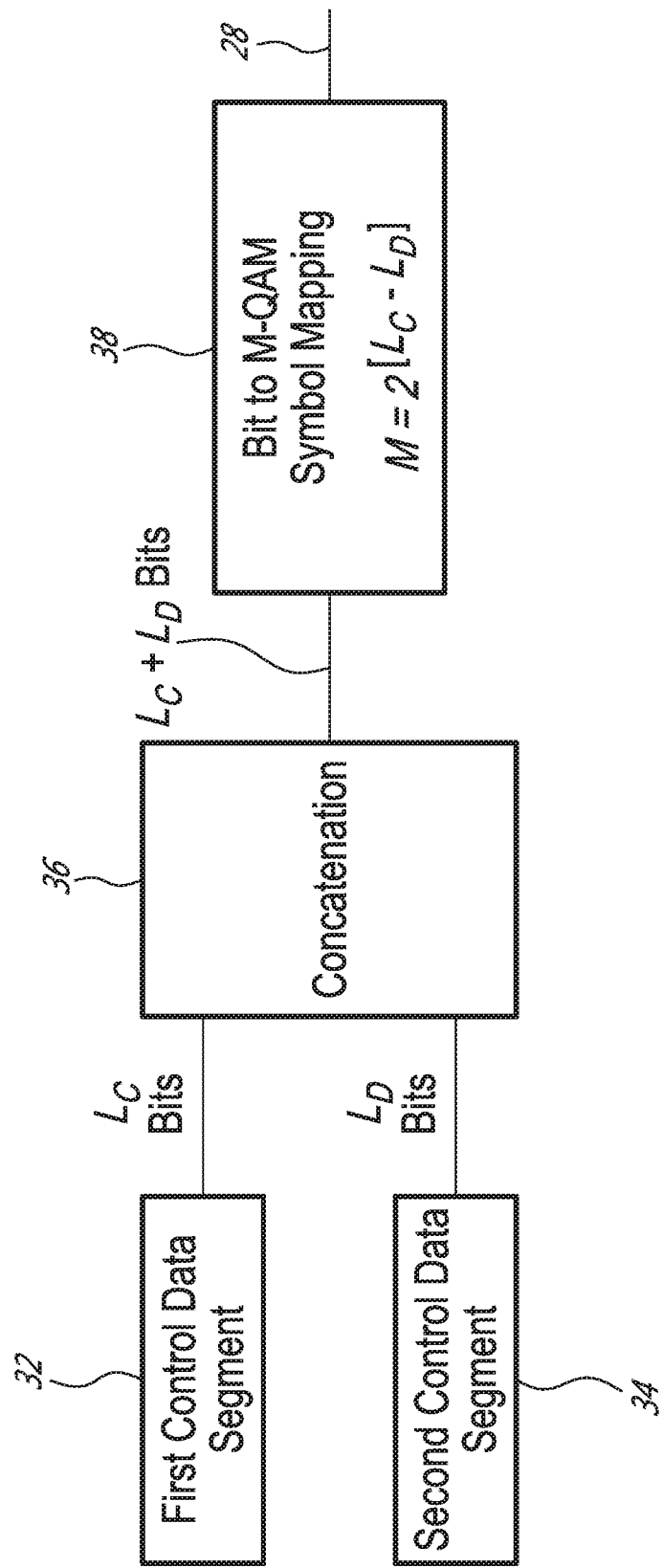
FIG. 4 is a block diagram of multi-layer modulation of control data according to one or more embodiments.

FIG. 4 illustrates additional details of this multi-layer or hierarchical modulation approach according to at least some embodiments. As shown, the radio network node 18 forms a multi-layer symbol 28 as an M-QAM symbol of modulation order M. To do so, the radio network node 18 obtains $L_C$ bits of a first control data segment 32 and $L_D$ bits of a second control data segment 34. In at least some embodiments, the radio network node 18 obtains the same number $L_C$ of bits of the first control data segment 32 independent of conditions on the control channel 24. Regardless, the radio network node 18 performs concatenation 36 of the control data bits into a total of $L_C + L_D$ bits. The radio network node 18 then performs bit-to-M-QAM symbol mapping 38, with $M = 2^{(L_C + L_D)}$, in order to produce an M-QAM symbol as the multi-layer (or hierarchically-modulated) symbol 28. This mapping 38 effectively multiplexes the control data bits of the first and second control data segments 32, 34 on different respective modulation layers 30A, 30B that are recoverable with demodulation at different orders. The first control-data modulation layer 30A is recoverable via demodulation at order $M_C = 2^{L_C}$ whereas the second control-data modulation layer 30B is recoverable via demodulation at order M. The second control data segment 34 is recoverable via demodulation at order M, rather than order $2^{L_D}$, because the second control data segment 34 is mapped to the M-order symbols in such a way that the second control data segment 34 is only distinguishable through at least M-order demodulation. The first control data segment 32 by contrast is recoverable via demodulation at order $M_C$, because the first control data segment is mapped to the M-order symbols in such a way that the first control data segment 32 is distinguishable through $M_C$-order demodulation.

Figure 5A:
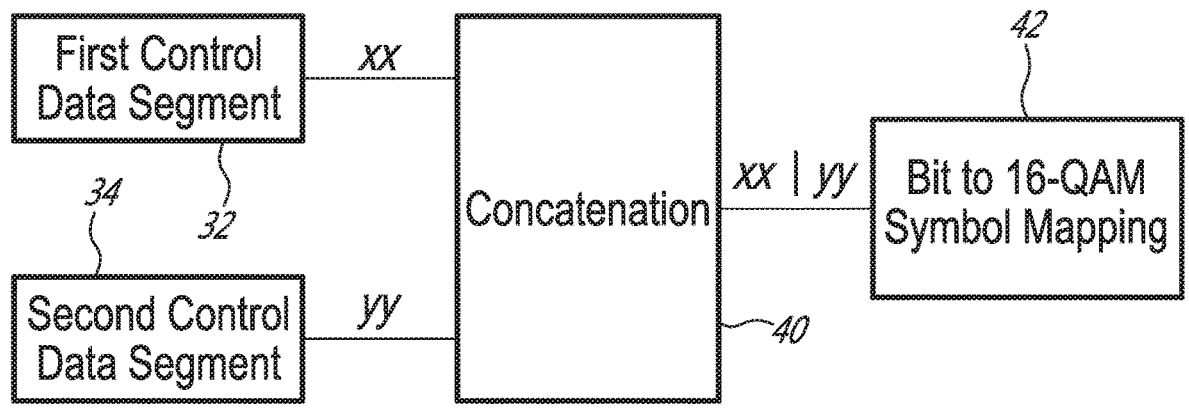
FIGS. 5A-5B are block diagrams of QPSK/16-QAM multi-layer modulation of control data according to one or more embodiments.
Figure 5B:
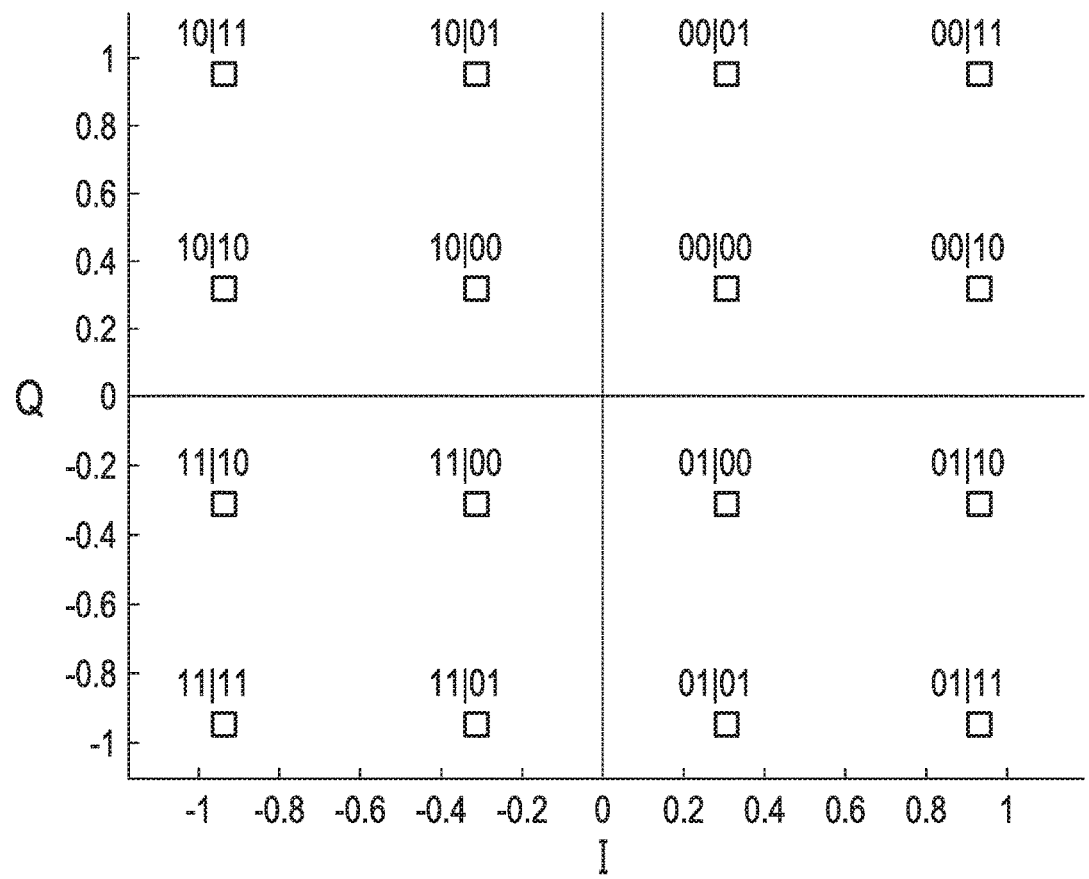

FIGS. 5A-5B show an example where the radio network node 18 forms a multi-layer symbol 28 as a 16-QAM symbol. As depicted in FIG. 5A, the radio network node 18 obtains 2 control data bits xx from a first control data segment (first control data segment 32) and 2 control data bits yy from a second control data segment (second control data segment 34), and performs concatenation 40 of those bits according to xx|yy. The radio network node 18 then performs a mapping 42 of the concatenated bits xx|yy into a 16-QAM symbol such that the control data bits xx from the first control data segment are mapped onto one modulation layer (namely, the first control-data modulation layer 30A) and the control data bits yy from the second control data segment are mapped onto a different modulation layer (namely, the second control-data modulation layer 30B).

FIG. 5B shows one example of different possible mappings in this regard. The radio network node 18 maps concatenated bits xx|yy to symbols in the 16-QAM constellation such that different combinations of control data bits xx are mapped to different quadrants (e.g., 00 maps to the upper right quadrant, 10 maps to the upper left quadrant, 11 maps to the lower left quadrant, and 01 maps to the lower right quadrants). This means that the control data bits xx can be recovered with QPSK demodulation, even though the symbol transmitted is 16-QAM, since QPSK demodulation just requires distinguishing the quadrant of the received symbol. The radio network node 18 also maps concatenated bits xx|yy to symbols in the 16-QAM constellation such that different combinations of control data bits yy are mapped to different symbols within the same quadrant. This means that the control data bits yy can only be recovered with 16-QAM demodulation, not QPSK demodulation. With recovery of the control data bits xx requiring at least QPSK demodulation, while recovery of the control data bits yy requires at least 16-QAM demodulation, the control data bits xx, yy are effectively multiplexed onto different modulation layers (a QPSK layer recoverable via demodulation at a relatively lower order of 4 and a 16-QAM layer recoverable via demodulation at a relatively higher order of 16). In this way, recovery of the control data bits yy proceeds via demodulation that effectively views the received symbol as a 16-QAM symbol within a 16-QAM constellation, whereas recovery of the control data bits xx proceeds via demodulation that effectively views the received symbol as a QPSK symbol within an overlaid QPSK constellation. That is, demodulation effectively maps the received symbol 28 to a QPSK constellation to recover the first control data segment, but maps the received symbol 28 to a 16-QAM constellation to recover the second control data segment.

Figure 6A:
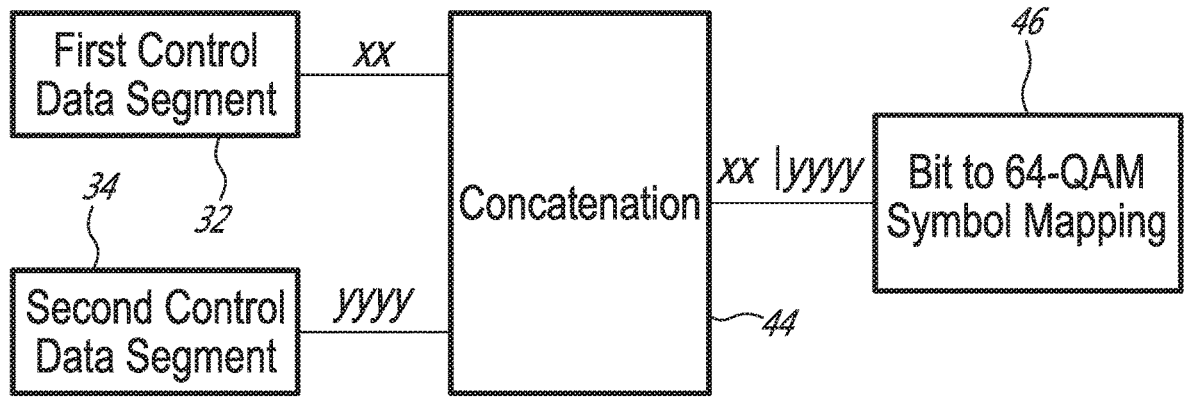
FIGS. 6A-6B are block diagrams of QPSK/64-QAM multi-layer modulation of control data according to one or more embodiments.
Figure 6B:
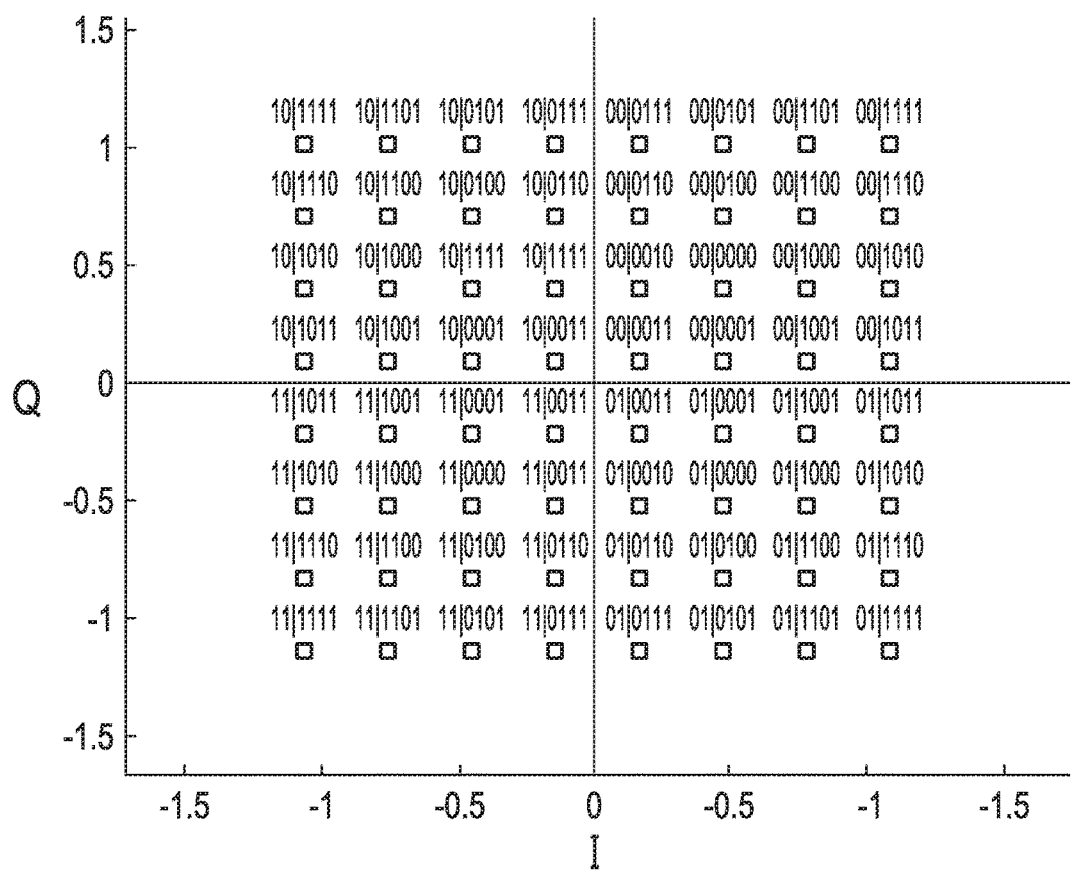

FIGS. 6A-6B show a different example where the radio network node 18 forms a multi-layer symbol 28 as a 64-QAM symbol. The node 18 performs concatenation 44 of 2 bits xx from a first control data segment (e.g. first control data segment 32) and 4 bits yyyy from a second control data segment (e.g. second control data segment 34) according to xx|yyyy, and performs a mapping 46 of the concatenated bits xx|yyyy into a 64-QAM symbol. The node 18 does so such that the control data bits xx from the first control data segment are mapped onto one modulation layer (namely, the first control-data modulation layer 30A) and the control data bits yyyy from the second control data segment are mapped onto a different modulation layer (namely, the second control-data modulation layer 30B). Specifically, as shown in FIG. 6B, the node 18 still maps concatenated bits xx|yyyy to symbols in the 64-QAM constellation such that different combinations of control data bits xx from the first control data segment are mapped to different quadrants. And the node 18 maps concatenated bits xx|yyyy to symbols in the 64-QAM constellation such that different combinations of control data bits yyyy from the second control data segment are mapped to different symbols within the same quadrant.

Figure 7:
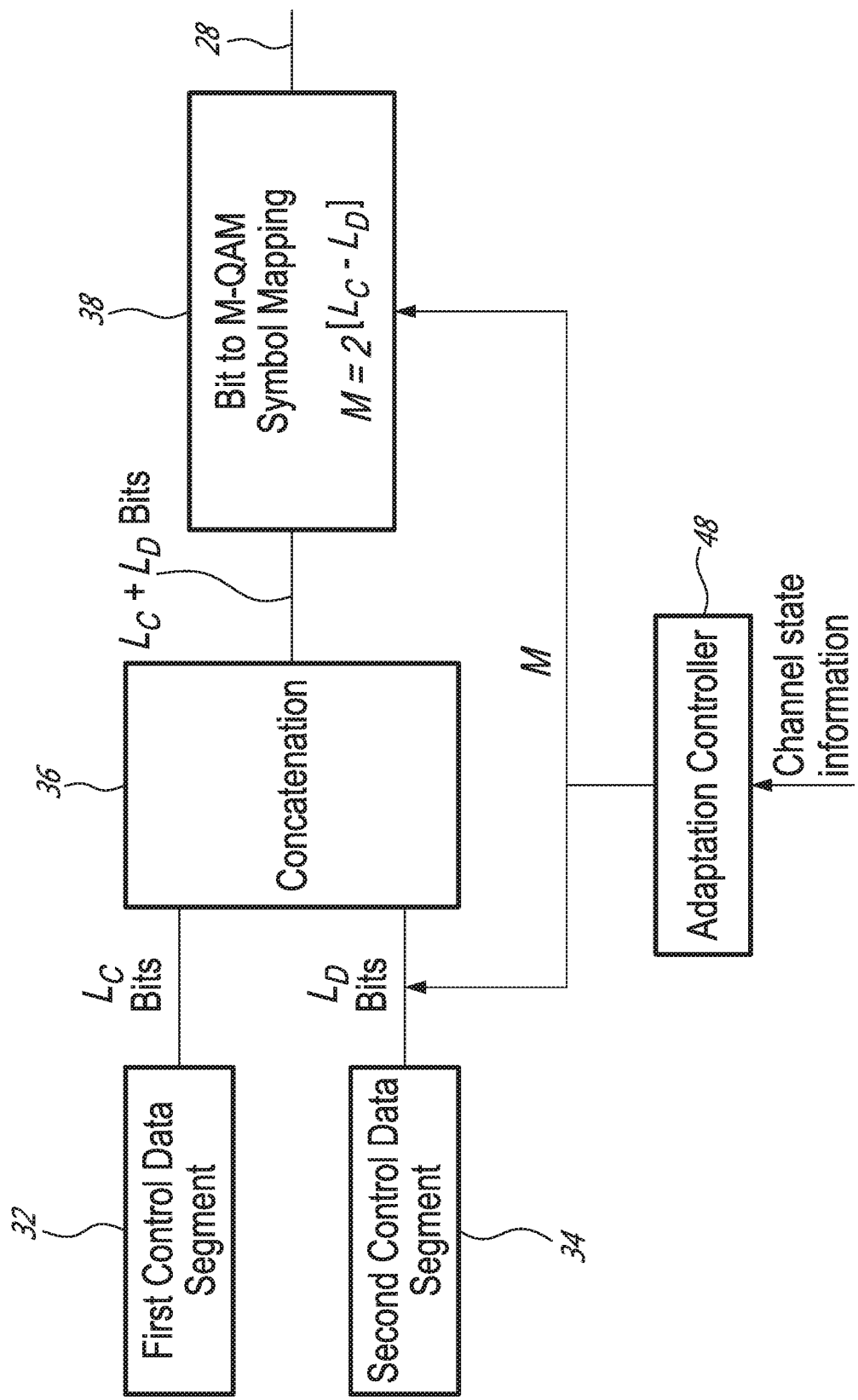
FIG. 7 is a block diagram of multi-layer modulation with dynamic adaptation of a higher order, according to one or more embodiments.

Notably, in at least some embodiments, the radio network node 18 dynamically adapts the higher modulation order at which the second control-data modulation layer 30B is to be demodulated for recovery, in dependence on conditions on the control channel 24 at the wireless communication device 16A. The radio network node 18 adapts this higher modulation order to current channel conditions so as to improve the control channel's spectral efficiency. This may increase the number of users scheduled at any given subframe or alternatively reduce the required resources allocated for control channels which in turn may translate into throughput gains. Despite this higher order adaptation, the radio network node 18 still generally refrains from dynamically adapting the lower order at which the first control-data modulation layer 30A is to be demodulated for recovery. That is, the node 18 generally statically fixes the lower order for recovery of the control data, e.g., to ensure control data robustness and minimize control data decoding complexity. For instance, in an LTE-based communication system, control data is always transmitted using a QPSK modulation order. FIG. 7 illustrates one such embodiment where the lower order used to modulate the control data is fixed.

As compared with FIG. 4, the radio network node 18 in FIG. 7 further includes an adaptation controller 48. The controller 48 obtains channel state or quality information describing current conditions (e.g. signal to interference and noise ratio (SINR), path loss, channel quality indicator (CQI), error rate, past successes and failures of control channel transmissions (e.g. acknowledgments (ACKs), negative-ACKs (NACKs), discontinuous transmissions (DTXs)), etc.) on the control channel 24 at the wireless communication device 16A. The channel state information in some embodiments also accounts for historical conditions on the control channel 24. Regardless, based on the channel state information received, the controller 48 dynamically controls the modulation order M of symbol mapping 38 and the number of bits from the second control data segment, e.g., through signaling indicating the maximum modulation order M that can be supported by the current channel conditions. The controller 48 in this regard increases the modulation order M (e.g., to 64) when the information indicates improved channel conditions, but decreases the modulation order M (e.g., to 16) when the information indicates deteriorated channel conditions. Adapting M in this way amounts to adapting the higher order M at which the second control-data modulation layer 30B is to be demodulated for recovery.

Even in the midst of dynamically adapting the higher order at which the second control-data layer 30B is to be demodulated, the lower order at which the first control-data modulation layer 30A is to be demodulated generally remains statically fixed, i.e., to $M_C$. In some embodiments, therefore, the radio network node 18 obtains the same number $L_C$ of first control data segment bits (e.g., $L_C=2$) independent of conditions on the control channel 24 (given the statically fixed lower modulation order for the first control data segment), but dynamically adapts the number $L_D$ of second control data segment bits obtained in dependence on conditions on the control channel 24. But, even though the lower order remains statically fixed, the bit error rate performance of lower order demodulation will prove similar to that of the higher order demodulation. This is because, for the same transmit power, the multi-layer symbol 28 has a lower minimum distance as compared to a single-layer symbol, since the multi-layer symbol 28 has a higher order than the order that the single layer symbol would have. Accordingly, in at least some embodiments, the radio network node 18 only conveys control data to a device using multi-layer modulation if the current conditions on the control channel 24 at that device support the higher order. That is, the node 18 selectively performs the processing 100 in FIG. 2 responsive to dynamically determining that conditions on the control channel 24 at a device to which the control data is addressed support the higher order. Notably, the second control data segment may therefore be conveyed to any device whose conditions on the control channel 24 support the higher order, provided that the device is of course configured to perform demodulation of the control channel 24 at the lower level.

With this in mind, the device 16A in some embodiments recovers the first control data segment addressed to it by demodulating only the first control-data modulation layer 30A at the lower order, and recovers the second control data segment by demodulating at least the second control-data modulation layer 30B at the higher order. In some embodiments, recovery of the second control data segment may involve demodulating only the second control-data modulation layer 30B at the higher order or demodulating both the first and second control-data modulation layers 30A, 30B at the higher order. However, other possibilities may exist for recovering the first and second control data segments.

In embodiments where recovery of the second control data segment involves demodulating only the second control-data modulation layer 30B, the device 16A may effectively isolate the second control-data modulation layer 30B from the first control-data modulation layer 30A. For example, the device 16A in some embodiments realizes this isolation by obtaining the absolute value of the real and imaginary parts of the received multi-layer symbol 28. Consider an example where the multi-layer symbol 28 is formed as shown in FIGS. 5A-5B, with the first two bits $b_1$, $b_2$ of the symbol 28 mapped to the first control-data modulation layer 30A and the third and fourth bits $b_3$, $b_4$ of the symbol 28 mapped to the second control-data modulation layer 30B. Assuming that the received complex 16-QAM symbol is represented as s, the third bit $b_3$ may be recovered to the exclusion of the other bits, by computing a soft value $c_3$ for the third bit as $$c_3 = |\text{real}(s)| - \frac{2}{\sqrt{10}}$$

and then making a hard decision for the third bit as $$b_3 = \left\{ \begin{array}{l} 1, c_3 \geq 0 \\ 0, c_3 < 0 \end{array} \right\}.$$

Similarly, the fourth bit $b_4$ may be recovered to the exclusion of the other bits, by computing a soft value $c_4$ for the fourth bit as $$c_4 = |\text{imag}(s)| - \frac{2}{\sqrt{10}}$$

and then making a hard decision for the fourth bit as $$b_4 = \left\{ \begin{array}{l} 1, c_4 \geq 0 \\ 0, c_4 < 0 \end{array} \right\}.$$

In embodiments where recovery of the second control data segment involves demodulating both the first and second control-data modulation layers 30A, 30B, by contrast, the device 16A demodulates both layers 30A, 30B at the higher order, to obtain higher-order demodulated data. However, the device 16A disregards a subset of the higher-order demodulated data (e.g., the first 2 bits xx) corresponding to the first control-data modulation layer 30A. The device 16A then recovers the second control data segment as a different subset of the higher-order demodulated data (e.g., the remaining bits yy) corresponding to the second control-data modulation layer 30B.

Irrespective of how the device 16A recovers the second control data segment, some embodiments exploit the first control data segment in the physical layer as including ("in-band") modulation signaling to support the multi-layer or hierarchical modulation approach herein, for example to indicate the presence of a second control data segment, to indicate the modulation order or transmission resources used, whether multi-layer modulation is activated or not and/or to provide symbol power or amplitude information. In some embodiments, the first control data segment indicates the higher order (e.g. using a modulation order indication) at which device 16A is to perform demodulation for recovery of the second control data segment. The first control data segment may advantageously do so as the higher order is dynamically adapted in dependence on conditions on the control channel 24 at the device 16A. Regardless, the higher order in some embodiments is the same order at which the device 16A is to demodulate symbols received over the data channel 26. In this case, the first control data segment may implicitly indicate the higher order (e.g. an implicit modulation order indication) at which the device 16A is to demodulate the second control-data modulation layer 30B of a symbol 28 received over the control channel 24, by explicitly indicating the order at which the device 16A is to demodulate symbols received over the data channel 26. Where the first control data segment comprises DCI in LTE-based embodiments, for example, this approach avoids imposing changes to existing DCI formats that are already standardized.

In other embodiments, the higher order is permitted to be different from the order at which the device 16A is to demodulate any symbols received over the data channel 26. In this case, a DCI format may be defined with additional bit(s) to indicate whether M=4, 16, 64, or 256 (e.g. one bit per set of two modulation levels) for demodulating a second control-data modulation layer 30B of a symbol 28 received over the control channel 24. These embodiments therefore require additional overhead (e.g. an explicit modulation order indication) as compared to embodiments that employ a common modulation order for both the data channel 26 and the control channel 24. Yet such embodiments have the advantage of providing flexibility in assigning different modulation orders for the control and data channels 24, 26. This may also be useful in embodiments where the modulation order supported in the control channel 24 is less than the order supported in the data channel 26 (e.g. as a result of the control data on the control channel being encoded with a less powerful channel encoding scheme than the scheme used for encoding user data on the data channel 26). Also, in other embodiments, if the conditions on the control channel 24 are more favorable than those on the data channel 26, the radio network node 18 may dynamically adapt the higher modulation order for the control channel 24 so that it is higher than the modulation order used for the data channel 26.

Additionally or alternatively, the first control data segment may include control signaling that indicates on which transmission resources (e.g., Resource Elements, RE, in LTE) one or more multi-layer symbols are transmitted for conveying a second control data segment intended for the device 16A. The device 16A may therefore inspect the first control data segment conveyed by one or more multi-layer symbols 28 in order to dynamically determine whether the symbol(s) 28 (or some other symbol received over the control channel 24) conveys control data associated with a second control data segment intended for that device 16A. Where the first control data segment comprises DCI in LTE-based embodiments, for example, the first control data segment may specify Resource Elements (REs) on which multi-layer symbols are transmitted (i.e., Multiplexed Resource Elements, MREs) by three fields: (1) is ePDCCH, which equals 0 if the MREs are part of the PDCCH and 1 if they are part of the ePDCCH; (2) Index, which is a control channel element (CCE) index for the case of PDCCH or an eCCE for the case of ePDCCH; and (3) Number, which is the number of CCEs or eCCEs aggregated for the PDCCH or ePDCCH. Regardless, responsive to determining that the symbol(s) 28 do indeed convey control data associated with a second control data segment intended for the device 16A as well, the device 16A may demodulate at least the second control-data modulation layer 30B at the higher order.

Additionally or alternatively, the first control data segment includes information that indicates the power level or amplitude used in the multi-layer symbols, for example, a power level indication that can be used by the device 16 as an index to a table of power levels or ratios (e.g. ratio of symbol power level and a reference signal). In an LTE embodiment, the device 16 relies instead on the power ratio between PDSCH and a reference signal (e.g. CRS or CSI-RS) to determine the symbol power level.

Alternatively or in addition to the above control signaling being conveyed as part of the control data on the control channel 24 (e.g. in the first control data segment), the signaling may comprise signaling at a layer above the physical layer, for example using signaling that is transmitted on a time basis slower than that on which the control channel 24 is transmitted. This signaling may be for instance include medium access control (MAC) or radio resource control (RRC) signaling. The slower time scale of these embodiments, though, slows the dynamic nature with which the higher order may be dynamically adapted. As yet another alternative, therefore, the "overhead" signaling for multiplexing an additional control data segment onto one or more control symbol(s) 28 may be conveyed on a different control symbol over a different control channel (not shown). That is, the device 16A may recover control data conveyed on a different symbol (which may or may not be hierarchically-modulated) over a different control channel, and use that control data to recover the control data conveyed in the additional control data segment in the symbol(s) 28 (i.e., by identifying the symbol(s) 28 as having control data in a second control data segment intended for the device 16A and/or by identifying the higher order with which the symbol's first control-data modulation layer 30B is to be demodulated).

In some embodiments, the control data conveyed on the first control-data modulation layer 30A is encoded such that it can be decoded independently of any control data that might be present in a second control-data modulation layer 30B. Advantageously in embodiments where a second control-data modulation layer is used in symbols 28 intended for a so-called "enhanced" or multi-layer modulation device configured to receive and demodulate control data on multiple modulation layers, the first control-data modulation layer 30A of symbol(s) 28 may still be blindly decoded by so-called "legacy" or single-layer modulation devices which may not be capable of or otherwise be configured to fully decode multi-layer symbols 28. This means that the second control-data modulation layer 30B is transparent to legacy devices, such that from the perspective of the legacy devices the control channel 24 appears reserved exclusively for conveying control data on a single modulation layer. The legacy device therefore is just configured to exclusively recover control data conveyed over the control channel 24 by only demodulating symbols received over the control channel 24 at the lower order, even when conditions on the control channel 24 at the legacy device support demodulation at the higher order. Recovery of the control data via lower order demodulation in this way remains unaffected by the fact that additional control data may have been multiplexed in an additional layer (with the exception of the bit error performance which may resemble that of high order demodulation). This proves advantageous, for example, in a system 10 where control data messages (i.e., DCI messages) conveyed over the control channel 24 must be blindly decoded. Maintaining lower order demodulation for blind decoding attempts of control data messages not only preserves backwards compatibility with single-layer modulation devices but also preserves lower blind decoding complexity for multi-layer modulation devices i.e. multi-layer modulation devices are not required to perform blind decoding for each possible modulation level.

In one example embodiment, a wireless communication device 16A or 16B may attempt to blindly decode a control data message (e.g., DCI) formed of first and second control data segments from the hierarchically-modulated or multi-layer symbol(s) 28, by demodulating the first control-data modulation layer 30A at the lower order. A single-layer modulation device having no knowledge of the multi-layer nature of symbol(s) 28 may "ignorantly" attempt to blind decode at the lower order, not knowing that symbol(s) 28 are actually higher order symbol(s). The complexity of these blind decoding attempts advantageously remains low by statically fixing the modulation order via which the first control data segment can be recovered. This notably remains the case even in embodiments where the system 10 dynamically adapts the modulation order via which the second control data segment can be recovered, to maximize the spectral efficiency of the control channel 24. Regardless, in one or more embodiments, the device 16A or 16B determines whether the control data message is addressed to the device 16A or 16B, based on whether the attempt to blindly decode the first control data segment succeeds. If the attempt succeeds, the device 16A, 16B can proceed to recover the first control data segment and possibly recover a second control data segment at the higher order if it exists (e.g. as indicated by a modulation order indication).

Figure 8:
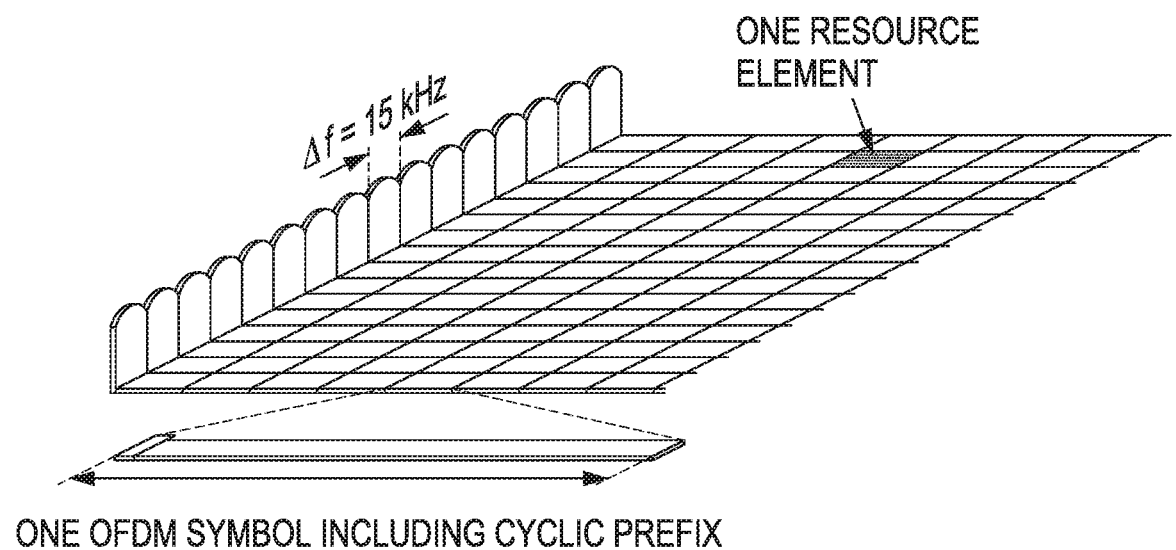
FIG. 8 is a block diagram of a time-frequency grid according to one or more LTE-based embodiments.

Consider now particular embodiments where the system 10 is or evolves from LTE. LTE uses OFDM in the downlink and Discrete Fourier Transform (DFT)-spread OFDM in the uplink. The basic LTE downlink physical resource can thus be seen as a time-frequency grid as illustrated in FIG. 8, where each Resource Element (RE) corresponds to one OFDM subcarrier during one OFDM symbol interval.

Figure 9:
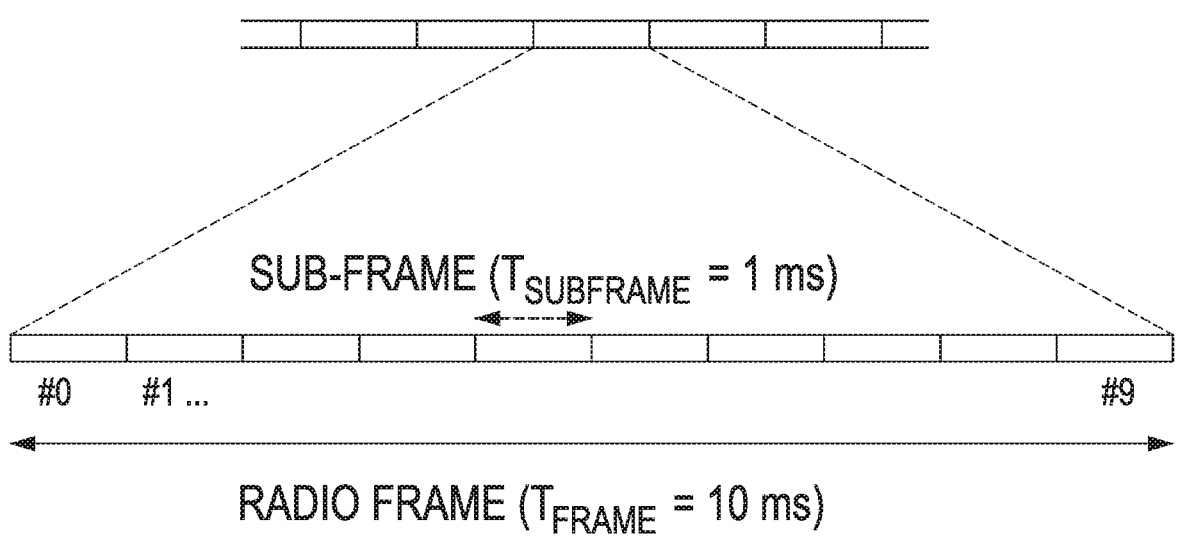
FIG. 9 is a block diagram of a frame structure according to one or more LTE-based embodiments.

As shown in FIG. 9, in the time domain, LTE downlink transmissions are organized into radio frames of 10 ms, each radio frame consisting of ten equally-sized subframes of length $T_{subframe}$=1 ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control data in the form of DCI indicating to which UEs data is transmitted over the PDSCH and upon which resource blocks the data is transmitted, in the current downlink subframe. The DCI may include for instance downlink scheduling assignments in the form of PDSCH resource indications, transport format, hybrid-ARQ information, and control information related to spatial multiplexing (if applicable). The DCI may also include a command for power control of the physical uplink control channel (PUCCH) used for transmission of hybrid-ARQ acknowledgements in response to downlink scheduling assignments. The DCI may further include uplink scheduling grants and power-control commands. The different types of control information correspond to different DCI message sizes, categorized into different DCI formats.

Figure 10:
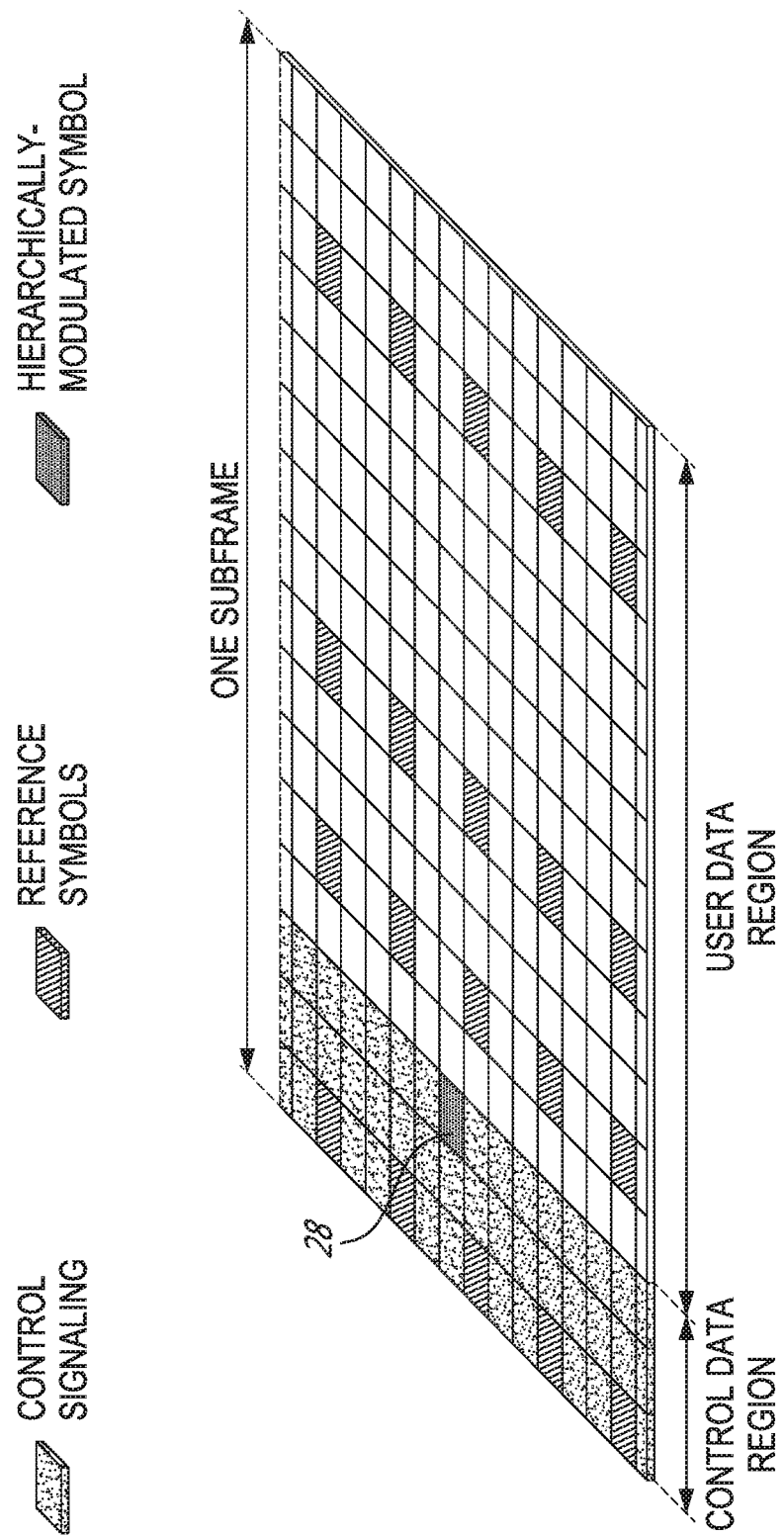
FIG. 10 is a block diagram of a subframe structure with user data multiplexed onto a control region according to one or more embodiments.

A DCI message may be transmitted over the PDCCH in the first 1, 2, or 3 OFDM symbols in each subframe under certain conditions (e.g., for bandwidths that accommodate more than 10 resource blocks), or over the first 2, 3, or 4 OFDM symbols in each subframe under other conditions (e.g., for bandwidths that accommodate less than 10 resource blocks). The region over which the PDCCH extends is designated as the control region. The number n=1, 2, 3 or 4 is known as the Control Format Indicator (CFI). A system with CFI=3 OFDM symbols as control is illustrated in FIG. 10. One PDCCH carries one DCI message with one of the different possible DCI formats. As will be described in further detail below, a cyclic redundancy check (CRC) is attached to each DCI message payload in a way to enable blind decoding of the DCI by both single-layer and multi-layer modulation UEs. The identity of the UE (or UEs) addressed—that is, the radio network temporary identifier (RNTI)—is included in the CRC calculation. Upon reception of DCI, a UE will check the CRC using its set of assigned RNTIs. If the CRC checks, the message is declared to be correctly received and intended for the UE. Thus, the identity of the UE to which a DCI message is addressed is implicitly encoded in the CRC and not explicitly transmitted. This reduces the amount of bits necessary to transmit on the PDCCH.

As multiple UEs can be scheduled simultaneously, requiring multiple downlink scheduling messages within each subframe, each scheduling message is transmitted on a separate PDCCH. Consequently, there are typically multiple simultaneous PDCCH transmissions conveying multiple different DCI messages. Since a UE does not know a priori the precise location of the DCI message(s) intended to it in a subframe, the UE must rely on blind decoding, where the UE searches the potential parts of the subframe where its DCI message(s), if any, may be transmitted.

To allow for simple yet efficient processing of PDCCH in the UE, the mapping of PDCCHs to resource elements (e.g. REs) is subject to a certain structure. This structure is based on so-called control channel elements (CCEs), which, in essence, is a convenient name for a set of 36 REs (or nine resource-element groups or REGs). The number of CCEs, one, two, four, or eight, required for a certain PDCCH depends on the payload size of the control data (DCI payload) and the channel-coding rate. This number of CCEs is referred to as the aggregation level. As the number of CCEs for each of the PDCCHs may vary and is not signaled, the UE has to blindly determine the number of CCEs used for the PDCCH it is addressed upon. To reduce the complexity of this process somewhat, certain restrictions on the aggregation of contiguous CCEs have been specified and define search spaces that the UE's search are constrained to. A search space is therefore a set of candidate PDCCHs formed by CCEs on a given aggregation level, which the UE is supposed to attempt to decode. As there are multiple aggregation levels, corresponding to one, two, four, and eight CCEs, a UE has multiple search spaces. In each subframe, a UE will attempt to decode all the PDCCHs that can be formed from the CCEs in each of its search spaces. If the CRC checks, the content of the PDCCH is declared as valid for the UE and the UE processes the DCI. In some embodiments, the control data is transmitted using one or more multi-layer symbols 28 over a number of CCEs in the control region of FIG. 10 defining a PDCCH within that control region. In other embodiments (not shown), the control data is transmitted within the user data region of FIG. 10, using one or more multi-layer symbols over a number of enhanced CCEs (eCCEs) defining an enhanced PDCCH (ePDCCH) within that user data region.

Figure 11:
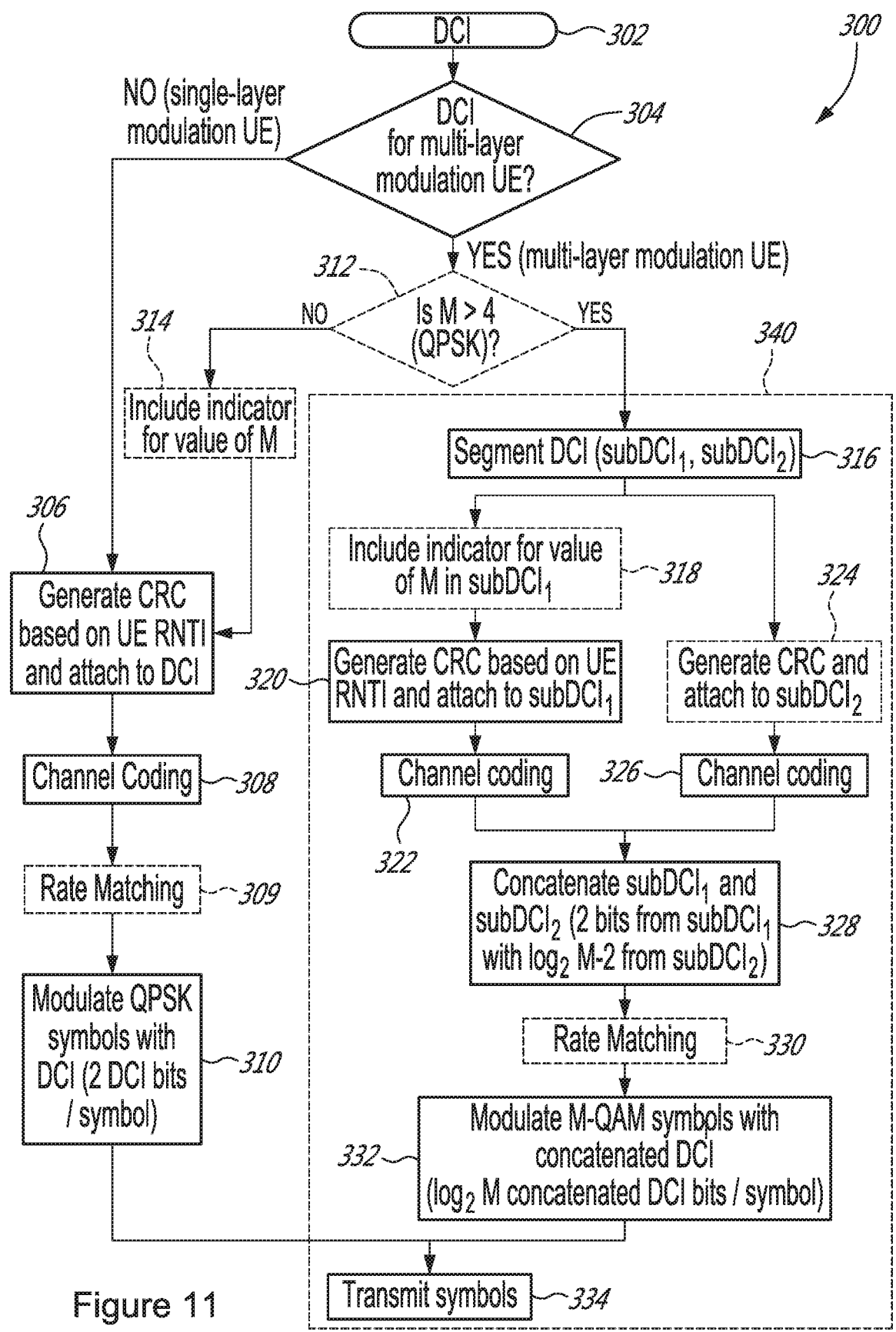
FIG. 11 is a logic flow diagram of another method implemented by a radio network node for transmitting control data in multi-layer symbols, according to one or more embodiments.
Figure 12:
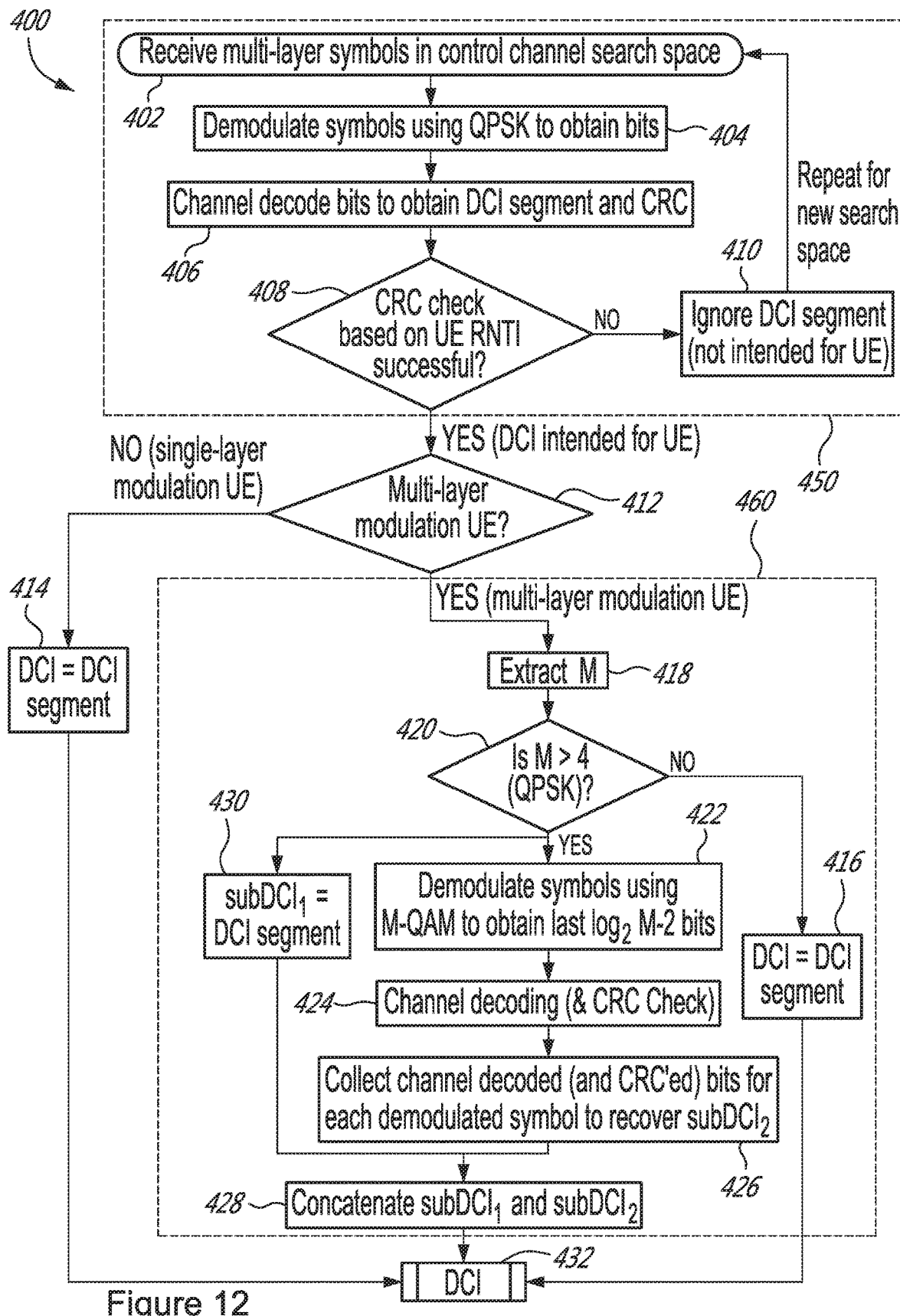
FIG. 12 is a logic flow diagram of another method implemented by a wireless communication device for recovering control data transmitted in multi-layer symbols, according to one or more embodiments.

FIGS. 11-12 illustrate details of example methods performed respectively by a radio network node 18 and a wireless communication device 16A according to certain embodiments where control data can be modulated at a higher modulation order for transmission (i.e. using multi-layer modulation) but such that single-layer and/or multi-layer modulation devices can attempt to blindly decode at least a portion (e.g. a first control-data modulation layer) via a lower modulation order. In one or more of these embodiments, the system 10 is or evolves from LTE, the wireless communication device 16A is a UE, and the control data includes DCI.

FIG. 11 shows steps (indicated as within Block 340) the radio node 18 might perform when multi-layer modulation is used (e.g. when the wireless communication device 16A is configured as a multi-layer modulation device) and steps (indicated as outside of Block 340) it might perform if single-layer modulation is used as well (e.g. when the wireless communication device 16A is configured as a single-layer modulation device). It is to be understood however that in some embodiments, the radio node 18 does not necessarily perform all of these steps. For example, in other embodiments, the radio node 18 does not perform the single-layer modulation steps (outside of Block 340) or might perform different single-layer modulations steps and/or different multi-layer modulation steps.

As shown in FIG. 11, the method begins at Block 302 where a radio network node 18 (e.g., eNB) generates a DCI payload for a UE. If the DCI payload is not intended for a multi-layer modulation UE (i.e. intended for a single-layer modulation UE) (Block 304), the node 18 generates a CRC based on an RNTI associated with the UE and attaches it to the DCI payload (Block 306). The CRC protected DCI payload is channel coded (e.g. using convolutional coding) (Block 308) and optionally subjected to rate-matching (Block 309) to meet the PDCCH bit requirement(s) that may be dictated by the CCE aggregation level. The node 18 then modulates single-layer (QPSK) symbols with the resulting channel-coded (and rate-matched) DCI bits (e.g. 2 DCI bits/symbol) for transmission e.g. over the PDCCH (Block 334).

If, on the other hand, the DCI payload is for a multi-layer modulation UE (YES at Block 304), the node 18 first determines the modulation order M to be used, for example based on the UE's control channel quality and/or UE's capabilities. If the modulation order M to be used is not greater than four (NO at Block 404), the node 18 optionally includes an explicit modulation order indicator for the value of M (not included if an implicit indication is used as described above) into the DCI payload (Block 314), attaches a CRC thereto (Block 406) and modulates single-layer (QPSK) symbols (Block 310) with the resulting channel-coded (and rate-matched) DCI bits after appropriate channel coding (Block 308) and rate matching (Block 309).

However, if the modulation order M to be used is greater than four, meaning that multi-layer modulation is to be used (YES at Block 312), the node 18 decomposes or segments the DCI payload into a first segment, subDCI$_1$ and at least one other segment subDCI$_2$ (only one shown) (Block 316), which may be the same or different sizes. Alternatively, the segmentation may be done as part of the DCI generation (ie. the DCI payload is generated as two segments at Block 302 (e.g. for a DCI payload intended for a multi-layer modulation UE). Regardless of how the subDCI$_1$ and subDCI$_2$ segments are generated from the DCI payload, the node 18 encodes the subDCI$_1$ and subDCI$_2$ segments such that UEs within a coverage area of the node 18 can attempt to blindly decode and recover the subDCI$_1$ segment via a lower modulation order (e.g. QPSK) independently of the presence of the subDCI$_2$ segment. In the example of FIG. 11, each of the subDCI$_1$, subDCI$_2$ segments is encoded separately (Blocks 322, 324). Prior to the encoding of the subDCI$_1$ segment, in some embodiments, the node 18 may optionally include an explicit modulation order indicator for the value of M (Block 318). The node 18 proceeds to generate and attach a corresponding CRC to the subDCI$_1$ segment based on (e.g. scrambled with) the UE's RNTI (Block 320). Note that the CRC for the subDCI$_1$ segment is generated independently of the subDCI$_2$ segment e.g. based on the subDCI$_1$ segment but not based on the subDCI$_2$ segment. Similarly, the node 18 may optionally generate and attach a CRC to the subDCI$_2$ segment (e.g. based on the subDCI$_2$ segment and the UE's RNTI) to provide additional reliability and enhance the likelihood of recovery by the UE (Block 324). The resulting (CRC protected) subDCI$_1$ and subDCI$_2$ segments are then channel-coded (Blocks 322, 326) independently. In some embodiments, generating the subDCI$_1$'s CRC independently from the subDCI$_2$ segment (i.e. not based on the subDCI$_2$ segment) also facilitates blind decoding at a lower modulation order (e.g. QPSK). The node 18 then concatenates the subDCI$_1$ and subDCI$_2$ segments on a bit-by bit basis e.g. concatenates 2 bits of the channel-coded subDCI$_1$ segment with $\log_2$ M−2 bits of the channel-coded subDCI$_2$ segment to produce a concatenated DCI bit stream (Block 330). After optionally subjecting the concatenated DCI bit stream to rate matching (Block 330), the node 18 modulates multi-layer symbols with the resulting concatenated (and rate-matched) DCI bits (e.g. $\log_2$ M concatenated bits/symbol) (Block 330) for transmission e.g. over the PDCCH (Block 334)

FIG. 12 illustrates a corresponding method 400 at the device 16A for receiving control data. This example method includes steps the device 16A might perform if configured as a multi-layer modulation device (indicated as within Blocks 450 and 460) but also includes steps the device 16A might perform if configured as a single-layer modulation device (indicated as within Block 450, 412, 414). It is to be understood however that in some embodiments, the device 16A does not necessarily perform all of these steps. For example, in other embodiments, the device 16A is configured as a multi-layer modulation device and does not perform the steps which are unnecessary for multi-layer modulation operation (e.g. Blocks 412, 414). Other possibilities exist, for example, depending on whether the device 16A is configured as a single-layer or multi-layer modulation device.

As shown in FIG. 12, the method begins with the UE attempting to perform a (blind) decoding procedure (Block 450) to recover its control data (e.g. DCI) from received multi-layer symbols using single-layer demodulation, for example using QPSK demodulation. In the blind decoding example of FIG. 12, the UE initially receives multi-layer symbols in a control channel search space (Block 402) and demodulates them using QPSK demodulation to obtain demodulated bits (Block 404). The UE then channel decodes the demodulated bits to obtain a first DCI segment and its corresponding CRC (Block 406). If a CRC check of the first DCI segment using the UE's RNTI(s) is not successful, the UE determines that the first DCI segment is not intended for it (i.e. ignores the first DCI segment) and repeats the receiving, demodulating and channel decoding steps for a new search space. If, on the other hand, the CRC check is successful (ie. successful blind decoding), the UE determines that the first DCI segment is intended for it.

There are many possibilities at this point. If the UE is a single-layer modulation UE (NO at Block 412), the UE determines that the first DCI segment constitutes its entire DCI (Block 414) and the method ends (Block 432). Alternatively, if the UE is a multi-layer modulation UE (YES at Block 412), the UE proceeds to determine if a second DCI segment was transmitted. In the example of FIG. 12, the UE extracts the modulation order M from the first DCI segment (or as signaled via upper layer signaling or otherwise implicitly indicated by various means as described above) (Block 418). If the modulation order M is not greater than four (e.g. QPSK modulation) (NO at Block 420), the UE determines that the first DCI segment constitutes its entire DCI (Block 416) and the method ends (Block 432). If, on the other hand, the modulation order M is greater than four (e.g. 16 QAM modulation) (YES at Block 420), the UE proceeds to recover a second DCI segment from the multi-layer symbols received so that it can recover its entire DCI. There are many different ways in which the UE can recover its entire DCI. In the example of FIG. 12, the UE demodulates each symbol (using a 16-QAM demodulator) and retains the last $\log_2 M-2$ bits (Block 422). The UE channel decodes the bits retained and performs an optional CRC check (if a CRC is present) (Block 424). The UE collects all of the channel decoded (and CRC'ed) bits for each demodulated symbol to recover a second DCI segment denoted as $subDCI_2$ (Block 426). Once the UE has concatenated the first DCI segment (denoted as $subDCI_1$) with the second DCI segment, $subDCI_2$ to obtain the entire DCI (Block 428), the method ends (Block 432).

Some or all of the techniques described in FIG. 11 may provide a number of benefits. For example, in some embodiments, attaching a CRC to the first DCI segment independently of the second DCI segment (e.g. with a CRC based on or corresponding to the first DCI segment but not based on or corresponding to the second DCI segment) may be beneficial in embodiments where control data messages (i.e., DCI messages) conveyed over the control channel 24 must be blindly decoded. Maintaining lower order demodulation for blind decoding attempts of control data messages not only preserves backwards compatibility with single-layer modulation devices but also preserves lower blind decoding complexity for multi-layer modulation devices i.e. multi-layer modulation devices are not required to perform blind decoding for each possible modulation order.

In other embodiments, the use of multi-layer modulation may advantageously reduce the number of resource elements (e.g. CCEs or eCCEs) required to transmit a DCI payload to multi-layer modulation UEs. This in turn may increase the spectral efficiency of the control channel(s) and permit more UEs to be scheduled and/or more DCI information to be transmitted in the same time interval (e.g. sub-frame).

Figure 13:
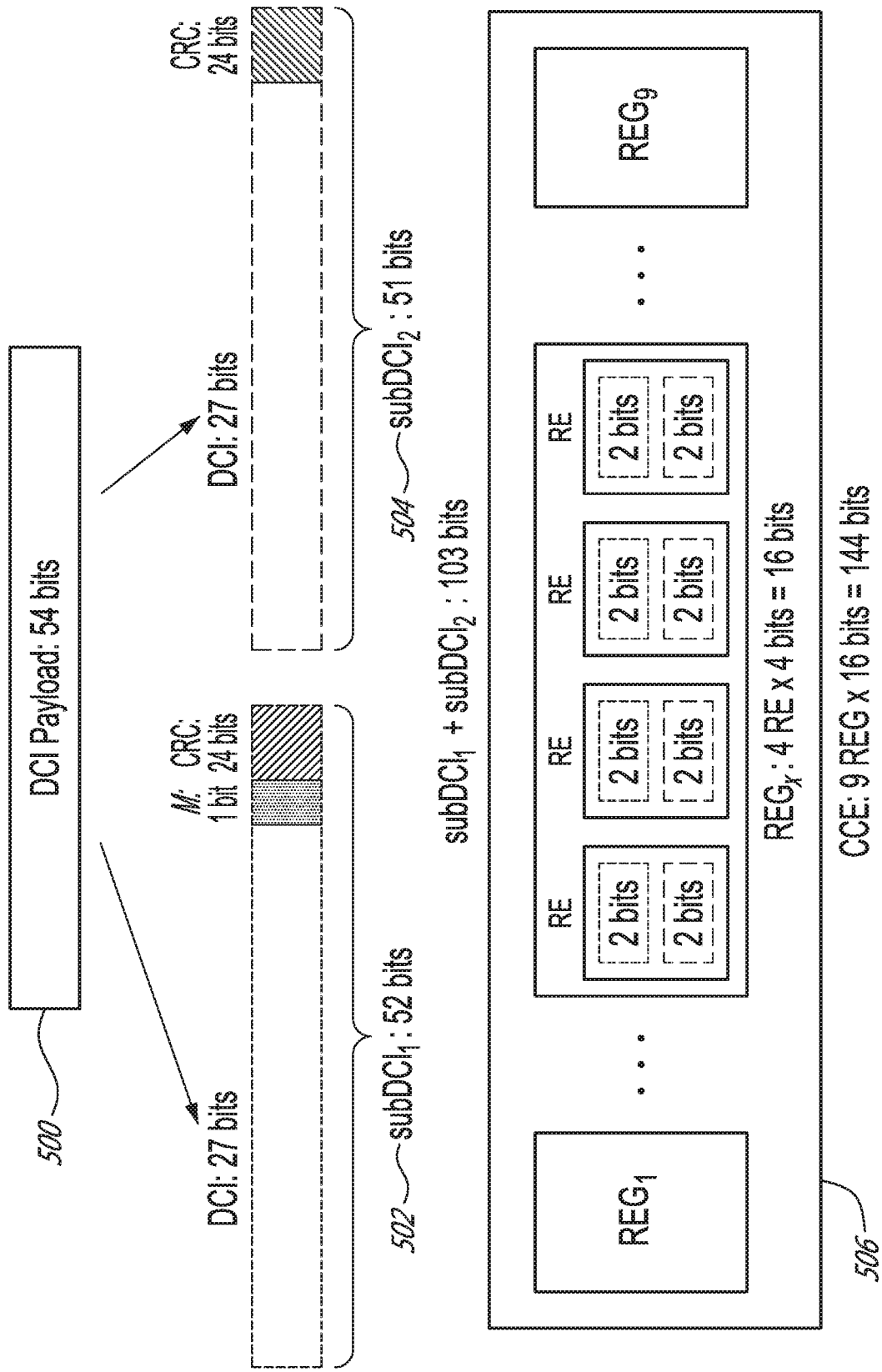
FIG. 13 is illustrates an example of a control data payload that can be transmitted to a wireless communication device using a reduced number of resource elements, according to one or more embodiments.

FIG. 13 illustrates an example of a control data payload (e.g. DCI payload 500) that can be transmitted to a wireless communication device configured as a multi-layer modulation UE using a reduced number of resource elements. In this example, the multi-layer modulation device is assumed to handle either a QPSK (M=4) or a 16 QAM (M=16) modulation order. The DCI payload 500 contains 54 bits (a typical size for Time Division Duplex (TDD) DCI format 2 with 1, 2, or 8 transmit antennas). Conventionally, a 54-bit DCI payload would have a total size of 78 bits (including a 24 bit CRC) and would therefore require two CCEs for transmission (assuming QPSK modulation). In the example of FIG. 13, the 54-bit DCI payload 500 is instead decomposed or segmented into two segments $subDCI_1$, $subDCI_2$ (denoted as 502, 504), each containing 27 bits. When the UE is capable of handling 16 QAM modulation (e.g. when the PDCCH channel conditions are favorable), the $subDCI_1$ segment is conveyed over a first modulation layer recoverable via QPSK demodulation while the $subDCI_2$ segment is conveyed over a second modulation recoverable via 16-QAM demodulation. In the $subDCI_1$ segment 502, a modulation order indication bit is added to indicate the value of the modulation order M used (e.g. 16 as opposed to 4) and a 24 bit CRC is attached for a total DCI segment size of 52 bits. In the $subDCI_2$ segment 504, a 24 bit CRC is also attached for a total DCI segment size of 51 bits. It is important to note also that the $subDCI_1$ and $subDCI_2$ segments 502, 504 may also contain a different number of DCI payload bits. For instance, in some embodiments, since the $subDCI_1$ segment 502 is modulated with QPSK, it may be desirable to assign more DCI payload bits to it (and perhaps less channel coding bits) as it may be less prone to errors compared to the $subDCI_2$ segment 504. Regardless of how many bits are allocated to each of the $subDCI_1$ and $subDCI_2$ segments 502, 504, using multi-layer modulation (where the $subDCI_1$ segment is conveyed over a first modulation layer and the $subDCI_2$ segment over a second modulation layer as described above), twice as many DCI bits can be packed into the same symbol (two bits from $subDCI_1$ and two bits from $subDCI_2$ in each RE), hence the number of CCEs required to transmit the DCI payload to the multi-layer modulation UE is reduced from two to one.

In other embodiments, instead of using the second modulation layer of multi-layer symbols to pack a DCI payload into fewer CCEs (or eCCEs), it is possible to use the second modulation layer to transmit control information that is in addition to control information conventionally conveyed via a single modulation layer. Signaling via the second modulation layer may be in addition to or an alternative to using upper layer signaling (e.g. RRC messages), for example, to send the additional control information on a more dynamic basis. In these embodiments, the use of the second modulation layer for sending the additional control information advantageously preserves backwards compatibility with single-layer modulation devices while at the same time provides an opportunity to introduce more advanced features on multi-layer modulation devices and/or improve their performance.

In one embodiment, the second modulation layer is used to convey information and/or parameters to a UE to facilitate Multi-User Multiple Input and Multiple Output (MU-MIMO) or Multi-User Superposition Transmission (MUST) operation. For example, a radio network node (the node 18) scheduling two or more (MU-MIMO or MUST) UEs on the same time-frequency resources (e.g. superposed PDSCHs) is configured to signal various MU-MIMO or MUST parameters used by or for each co-scheduled UE to other co-scheduled UEs via the second modulation layer. With that information, co-scheduled UEs can be configured to conduct inter-UE interference reduction or cancellation and/or improve their performance. The MU-MIMO or MUST information signaled could include any (or a combination) of each UE's precoding (beam) information, (PDSCH) transmit power, transmit diversity scheme or number of (PDSCH) layers used, etc. Below is an example of a format for signaling MU-MIMO or MUST information to a particular UE (e.g. UE_N) via the second modulation layer.

UE_1 {precoding vector (or beam vector), transmit power, layers, etc.}
UE_2 {precoding vector (or beam vector), transmit power, layers, etc.}
[ . . . ]
UE_N−1 {precoding vector (or beam vector), transmit power, layers, etc.}

In another embodiment, the second modulation layer is used to convey information and/or parameters to a UE to facilitate (Downlink or DL) Coordinated Multi-Point (CoMP) operation. In one example, a radio network node (the node 18) in a CoMP set of Transmit Points (TPs) is configured to signal various CoMP-related parameters used by the TPs in the set via the second modulation layer. With that information, the UE can be configured to facilitate reception and improve its CoMP performance. The CoMP-related information signaled could include any (or a combination) of each TP's phase, transmit power, layers, layer number(s), Reference Signals (RS) used, etc. Below is an example of a format for signaling CoMP-related information for N TPs to a UE via the second modulation layer.

TP_1 {phase, transmit power, layers, layer no, RS}
TP_2 {phase, transmit power, layers, layer no, RS}
[ . . . ]
TP_N {phase, transmit power, layers, layer no, RS}

In yet another embodiment, the second modulation layer is used to convey power control information related to downlink (e.g. PDSCH) transmissions. In some implementations, downlink power control information is sent dynamically on a sub-frame basis (e.g. in the sub-frames when PDSCH is scheduled) to help cope with dynamic variations in channel conditions which may occur at a faster rate than the rate at which conventional power control signaling is conducted (e.g. via RRC signaling). Power control information signaled via the second modulation layer may be in addition to or as an alternative for power control information sent via an upper layer (e.g. RRC). In other implementations, signaling power control dynamically via the second modulation layer dynamically on a sub-frame basis may improve performance and/or reduce interference to other UEs.

In yet another embodiment, the second modulation layer is used to convey muting information in relation to reference signals (e.g. Cell Reference Signals) such as for example, an indication of when muting is activated and/or a muting duration (e.g. as a number of TTIs). In yet another embodiment, the second modulation layer is used to convey antenna configuration information.

Figure 14:
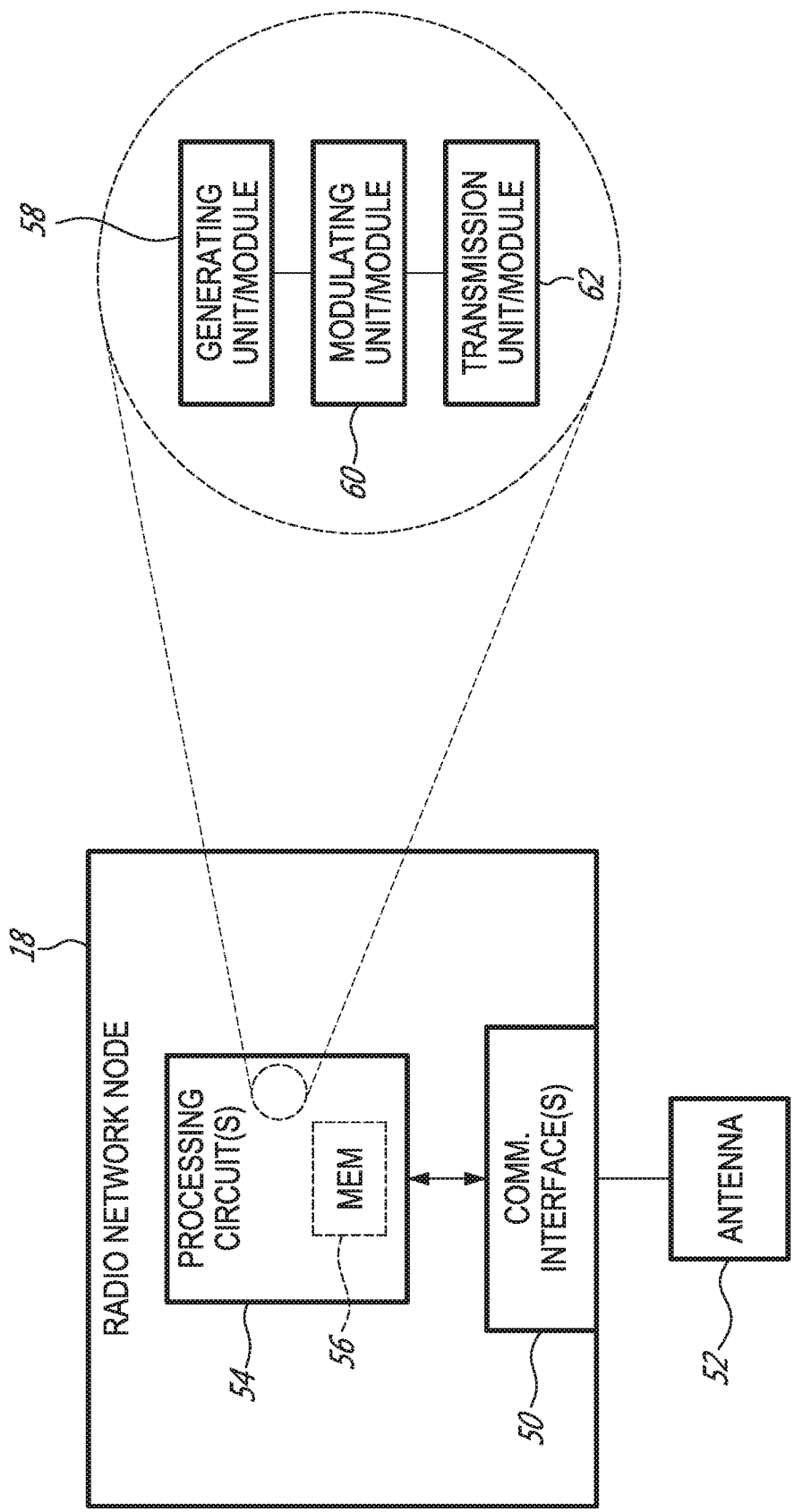
FIG. 14 is a block diagram of a radio network node according to one or more embodiments.

In view of the various modifications and variations herein, those skilled in the art will appreciate that a radio network node 18 herein is configured to perform the functionality described herein (e.g., as shown in the examples of FIGS. 2 and 11) via any functional means or units. FIG. 14 illustrates one example radio network node 18 (e.g., a base station such as an eNodeB in LTE-based systems) in this regard. The radio network node 18 comprises one or more communication interfaces 50 for communicating with a wireless communication device 16A via an antenna 52. The one or more communication interfaces 50 may also interface with other nodes in the system. For communicating with the device 16A, though, the interface(s) 50 may include transceiver circuits that, for example, comprise transmitter circuits and receiver circuits that operate according to LTE or other standards.

The radio network node 18 also comprises circuitry or processing circuits 54, which may comprise one or more processors, hardware circuits (e.g. application-specific integrated circuit (ASIC), field-programmable gate array (FPGA), etc.), firmware, or a combination thereof. These processing circuits 54 in some embodiments operate in conjunction with memory 56 that stores instructions executed by one or more processors of the processing circuits 54. Memory 56 may comprise one or more volatile and/or non-volatile memory devices. Program code for controlling operation of the radio network node 18 is in some embodiments stored in a non-volatile memory, such as a read-only memory or flash memory. Temporary data generated during operation may be stored in random access memory. The program code stored in memory, when executed by the processing circuit(s) 54, causes the processing circuit(s) 54 (and hence the device 16A) to perform the methods described above in relation with the radio network node 18.

FIG. 14 illustrates the main functional components of the processing circuit(s) 54 according to different embodiments. In one exemplary embodiment, the functional components include a generating unit or module 58 for generating first and second control data segments for a wireless communication device 16A, a modulating unit or module 60 for modulating the first and second control data segments to form multi-layer symbols 28 and a transmission unit or module 62 for transmitting the multi-layer symbols 28 as described above. In one embodiment, these units or modules each comprise a programmable circuit that is configured by program code stored in memory to perform their respective functions. In other embodiments, one or more of the functional components may be implemented, in whole or in part, by hardware circuits.

Figure 15:
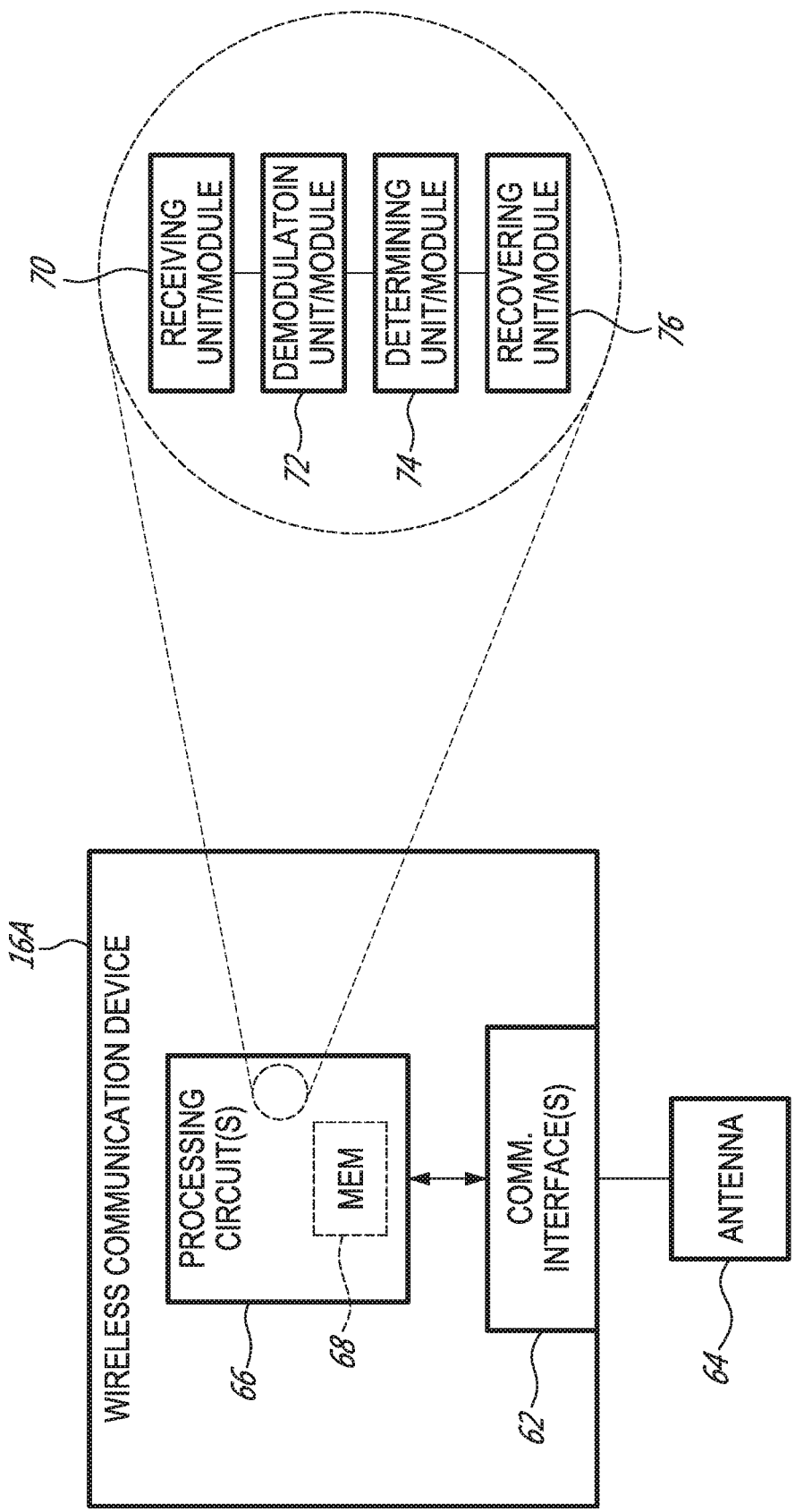
FIG. 15 is a block diagram of a wireless communication device according to one or more embodiments.

Also in view of the various modifications and variations herein, those skilled in the art will appreciate that a wireless communication device 16A herein is configured to perform the processing herein (e.g., as shown in FIGS. 3 and 12) via any functional means or units. FIG. 15 illustrates one example wireless communication device 16A (e.g., a UE in LTE-based systems) in this regard. The device 16A comprises one or more communication interfaces 62 for communicating with one or more radio network nodes 18 via an antenna 64. The one or more communication interfaces 62 may include transceiver circuits that, for example, comprise transmitter circuits and receiver circuits that operate according to LTE or other standards.

The wireless communication device 16A also comprises circuitry or processing circuits 66, which may comprise one or more processors, hardware circuits (e.g. application-specific integrated circuit (ASIC), field-programmable gate array (FPGA), etc.), firmware, or a combination thereof. These processing circuits 66 in some embodiments operate in conjunction with memory 68 that stores instructions executed by one or more processors of the processing circuits 66. Memory 68 may comprise one or more volatile and/or non-volatile memory devices. Program code for controlling operation of the wireless communication device 16A is in some embodiments stored in a non-volatile memory, such as a read-only memory or flash memory. Temporary data generated during operation may be stored in random access memory. The program code stored in memory, when executed by the processing circuit(s) 66, causes the processing circuit(s) 66 (and hence the device 16A) to perform the methods described above in relation to the wireless communication device 16A.

FIG. 15 illustrates the main functional components of the processing circuit(s) 66 according to different embodiments. In one exemplary embodiment, the functional components include a receiving unit or module 70 for receiving the multi-layer symbols 28 conveying first and second control data segments, a demodulation unit or module 72 for obtaining first-order demodulated data (e.g. a first control data segment), a determining unit or module 74 for determining if the first-order demodulated data is intended for the device 16A, and a recovering unit or module 76 for recovering one or more of the first and second control data segments if the first-order demodulated data is intended for the device 16A as described above. In one embodiment, these units or modules each comprise a programmable circuit that is configured by program code stored in memory to perform their respective functions. In other embodiments, one or more of the functional components may be implemented, in whole or in part, by hardware circuits.

Embodiments herein also include a computer program comprising instructions which, when executed by at least one processor of a radio node 18, causes the radio node 18 to carry out any of the methods herein. In one or more embodiments, a carrier containing the computer program is one of an electronic signal, optical signal, radio signal, or computer readable storage medium.

Those skilled in the art will also appreciate that the embodiments herein are equally applicable to radio networks and wireless communication devices implementing any access technology and standard. This remains the case even though various embodiments have been described within the context of LTE. LTE is therefore used as just an example for understanding the problems and solutions herein and should not be seen as limiting. For example, the radio networks may also include other 3$^{rd}$ Generation Partnership Project (3GPP) networks (e.g. Universal Mobile Telecommunications System (UMTS), LTE-Advanced (LTE-A)), LTE-Unlicensed (LTE-U), 4$^{th}$ Generation (4G), 5$^{th}$ Generation (5G) or other future generations of a 3GPP communication network infrastructure. More generally, the radio networks may include any current or future wireless network infrastructure configured to transmit control data or information over a control channel.

Those skilled in the art will further appreciate that "wireless communication device" is a non-limiting term comprising any device equipped with a wireless interface allowing for receiving wireless signals from a radio network node. Some examples of a wireless communication device in a general sense are a user equipment (UE), a station (STA), a laptop, a mobile terminal, a machine-to-machine (M2M) device, a device capable of device-to-device (D2D) communication, a fixed relay, mobile relay, a radio network node equipped with a UE-like interface (e.g., an location measurement unit, LMU), a femto base station or a small base station using the terminal technology). A wireless communication device herein may be capable of operating in one or more frequencies, carrier frequencies, component carriers or frequency bands. The device may operate in single- or multi-RAT or multi-standard mode (e.g., an example dual-mode device may operate with any one or combination of WiFi and LTE).

A radio network node is a non-limiting term comprises any node comprised in a radio network (e.g., an LTE RAN) that at least transmits radio signals to one or more wireless communication devices. Some examples of a radio network node include a radio base station (e.g., eNodeB in LTE or NodeB in UTRAN), an access point (AP), a relay, a mobile relay, a remote radio unit (RRU), a remote radio head (RRH), a sensor, a beacon device, a measurement unit (e.g., LMUs), user terminal, mobile terminal, laptop, etc.

Other Embodiments

In one broad aspect, there is provided a method implemented by radio network node for transmitting control data to a wireless communication device in a wireless communication system that includes a control channel over which control data is transmitted. The method includes generating first and second control data segments for the wireless communication device with the first control data segment including an error detection code generated based on an identifier of the wireless communication device. The method further includes modulating the first and second control data segments to form one or more multi-layer symbols with a first layer conveying the first control data segment and a second layer conveying the second control data segment and where the first layer is recoverable via demodulation at a first order and the second layer is recoverable via demodulation at a second order higher than the first order. The method also includes transmitting the one or more multi-layer symbols to the wireless communication device over the control channel.

In some node embodiments, generating the first and second control data segment includes segmenting a control data message intended for the wireless communication device to produce the first and second control data segments. In other node embodiments, prior to the modulating, the method further includes encoding each of the first and second control data segments independently and concatenating the first control data segment with the second control data segment.

In yet other node embodiments, the error detection code included in the first control data segment is generated based on the first control data segment but not based on the second control data segment to enable blind decoding attempts by devices configured for demodulation at the first order and by devices configured for demodulation at the first and second orders. In yet other node embodiments the error detection code is a CRC code scrambled with a RNTI of the wireless communication device, and/or the second control data segment includes a different error detection code.

In yet other node embodiments, the method further includes sending a modulation order indication to the wireless communication device indicating the second order. The modulation order may be sent included in the first control data segment or an upper layer signaling message.

In yet other node embodiments, the wireless communication system is or evolves from an LTE system, where the control channel is one of a PDCCH and an ePDCCH. In yet other node embodiments, the first and second control data segments are DCI segments, the first layer is recoverable via QPSK demodulation, and the second layer is recoverable via M-QAM demodulation, where M is greater than 4.

In another broad aspect, there is provided a radio network node configured for transmitting control data to a wireless communication device in a wireless communication system that includes a control channel over which control data is transmitted. The radio network node includes circuitry containing instructions which, when executed, cause the radio network node to perform any of the node method embodiments described above.

In yet another broad aspect, there is provided a non-transitory computer readable memory configured to store executable instructions for a radio network node configured for transmitting control data to a wireless communication device in a wireless communication system that includes a control channel over which control data is transmitted. The executable instructions when executed by a processor cause the radio network node to perform any of the node method embodiments described above.

In yet another broad aspect, there is provided a radio network node configured for transmitting control data to a wireless communication device in a wireless communication system that includes a control channel over which control data is transmitted. The radio network node includes a transceiver, a processor and a memory containing a generating module configured to generate first and second control data segments for the wireless communication device with the first control data segment including an error detection code generated based on an identifier of the wireless communication device. The memory further contains a modulating module configured to modulate the first and second control data segments to form one or more multi-layer symbols with a first layer conveying the first control data segment and a second layer conveying the second control data segment and where the first layer is recoverable via demodulation at a first order and the second layer is recoverable via demodulation at a second order higher than the first order. The memory further contains a transmission module configured to transmit the one or more multi-layer symbols to the wireless communication device over the control channel.

In some node embodiments, the generating modules generates the first and second control data segment includes by segmenting a control data message intended for the wireless communication device to produce the first and second control data segments. In other node embodiments, the memory further includes a encoding module configured to encode each of the first and second control data segments independently prior to the modulating, and a concatenating module to concatenate the first control data segment with the second control data segment.

In yet other node embodiments, the error detection code included in the first control data segment is generated based on the first control data segment but not based on the second control data segment to enable blind decoding attempts by devices configured for demodulation at the first order and by devices configured for demodulation at the first and second orders. In yet other node embodiments the error detection code is a CRC code scrambled with a RNTI of the wireless communication device, and/or the second control data segment includes a different error detection code.

In yet other node embodiments, the memory further includes a sending module configure to send a modulation order indication to the wireless communication device indicating the second order. The modulation order may be sent included in the first control data segment or an upper layer signaling message.

In yet other node embodiments, the wireless communication system is or evolves from an LTE system, where the control channel is one of a PDCCH and an ePDCCH. In yet other node embodiments, the first and second control data segments are DCI segments, the first layer is recoverable via QPSK demodulation, and the second layer is recoverable via M-QAM demodulation, where M is greater than 4.

In yet another broad aspect, there is provided a method implemented by a wireless communication device for receiving control data from a radio network node in a wireless communication system that includes a control channel over which control data is transmitted. The method includes receiving over the control channel one or more multi-layer symbols conveying a first control data segment in a first layer that is recoverable via demodulation at a first order and conveying a second control data segment in a second layer that is recoverable via demodulation at a second order, higher than the first order. In that method, the first control data segment includes an error detection code generated based on a device identifier. The method further includes demodulating the first layer at the first order to obtain first-order demodulated data, determining if the first-order demodulated data is intended for the wireless communication device based on an identifier of the wireless communication device, and if the first-order demodulated data is intended for the wireless communication device, recovering one or more of the first and second control data segments.

In some device embodiments, the recovering the second control data segment includes determining the second order from a received modulation order indication and demodulating the second layer at the second order based on the modulation order. In other device embodiments, recovering the second control data segment includes demodulating the second layer at the second order to obtain second-order demodulated data, and recovering the second control data segment from the second-order demodulated data. In yet other device embodiments, the method further includes concatenating the first and second control data segments recovered to form a control data message intended for the wireless communication device. In yet other device embodiments, the demodulating and determining is for an attempt to blindly decode the first-order demodulated data to recover the first control data segment based on the wireless communication device identifier.

In yet other device embodiments, the determining includes performing an error detection check of the first-order demodulated data based on the wireless communication device identifier. In yet other device embodiments, the error detection code included in the first control data segment is generated based on the first control data segment but not based on the second control data segment to enable blind decoding attempts by devices configured for demodulation at the first order and by devices configured for demodulation at the first and second orders. In yet other device embodiments, the error detection code is a CRC code scrambled with an RNTI of the wireless communication device. In yet other device embodiments, the second control data segment includes a different error detection code.

In yet other device embodiments, the method further includes receiving a modulation order indication from the radio network node indicating the second order. In yet other device embodiments, the modulation order indication is included in one of the first control data segment and an upper layer signaling message.

In yet other device embodiments, the wireless communication system is or evolves from an LTE system, where the control channel is one of a PDCCH and an ePDCCH, where the first and second control data segments are DCI segments, and/or where the first layer is recoverable via QPSK demodulation, and the second layer is recoverable via M-QAM demodulation, where M is greater than 4.

In another broad aspect, there is provided a wireless communication device configured to receive control data from a radio network node in a wireless communication system that includes a control channel over which control data is transmitted. The wireless communication device includes circuitry containing instructions which, when executed, cause the device to perform any of the device method embodiments described above.

In yet another broad aspect there is provided a non-transitory computer readable memory configured to store executable instructions for a wireless communication device configured to receive control data from a radio network node in a wireless communication system that includes a control channel over which control data is transmitted. The executable instructions when executed by a processor cause the wireless communication device to perform any of the device method embodiments described above.

In yet another broad aspect, there is provided a wireless communication device configured to receive control data from a radio network node in a wireless communication system that includes a control channel over which control data is transmitted. The wireless communication device includes a transceiver, a processor and a memory containing a receiving module configured to receive over the control channel one or more multi-layer symbols conveying a first control data segment in a first layer that is recoverable via demodulation at a first order and conveying a second control data segment in a second layer that is recoverable via demodulation at a second order, higher than the first order, where the first control data segment includes an error detection code generated based on a device identifier. The memory further contains a demodulating module configured to demodulate the first layer at the first order to obtain first-order demodulated data, a determining module configured to determine if the first-order demodulated data is intended for the wireless communication device based on an identifier of the wireless communication device and a recovering module configured to recover one or more of the first and second control data segments if the first-order demodulated data is intended for the wireless communication device.

In some device embodiments, the recovering module is configured to recover the second control data segment by determining the second order from a received modulation order indication and demodulating the second layer at the second order based on the modulation order. In other device embodiments, the recovering module is configured to recover the second control data segment by demodulating the second layer at the second order to obtain second-order demodulated data, and recovering the second control data segment from the second-order demodulated data. In yet other device embodiments, the memory further includes a concatenating module configured to concatenate the first and second control data segments recovered to form a control data message intended for the wireless communication device. In yet other device embodiments, the demodulating and determining modules are configured to attempt to blindly decode the first-order demodulated data to recover the first control data segment based on the wireless communication device identifier.

In yet other device embodiments, the determining module is further configured to perform an error detection check of the first-order demodulated data based on the wireless communication device identifier. In yet other device embodiments, the error detection code included in the first control data segment is generated based on the first control data segment but not based on the second control data segment to enable blind decoding attempts by devices configured for demodulation at the first order and by devices configured for demodulation at the first and second orders. In yet other device embodiments, the error detection code is a CRC code scrambled with an RNTI of the wireless communication device. In yet other device embodiments, the second control data segment includes a different error detection code.

In yet other device embodiments, the receiving module is further configured to receive a modulation order indication from the radio network node indicating the second order. In yet other device embodiments, the modulation order indication is included in one of the first control data segment and an upper layer signaling message.

In yet other device embodiments, the wireless communication system is or evolves from an LTE system, where the control channel is one of a PDCCH and an ePDCCH, where the first and second control data segments are DCI segments, and/or where the first layer is recoverable via QPSK demodulation, and the second layer is recoverable via M-QAM demodulation, where M is greater than 4.

The present disclosure may, of course, be carried out in other ways than those specifically set forth herein. The present embodiments are to be considered in all respects as illustrative and not restrictive, and all changes coming within the meaning and equivalency range of the appended claims are intended to be embraced therein.

The invention claimed is:

1. A method implemented by radio network node for transmitting control data to a wireless communication device in a wireless communication system that includes a control channel over which control data is transmitted, the method comprising:
  generating first and second control data segments for the wireless communication device, the first control data segment including an error detection code generated based on an identifier of the wireless communication device;
  encoding each of the first and second control data segments independently and concatenating the first control data segment with the second control data segment;
  modulating the first and second control data segments to form one or more multi-layer symbols with a first layer conveying the first control data segment a second layer conveying the second Control data segment, the first layer being recoverable via demodulation at a first order and the second layer being recoverable via demodulation at a second order higher than the first order; and
  transmitting the one or more multi-layer symbols to the wireless communication device over the control channel.

2. The method of claim 1, wherein generating the first and second control data segments comprises segmenting a control data message intended for the wireless communication device to produce the first and second control data segments.

3. The method of claim 1, wherein the error detection code included in the first control data segment is generated based on the first control data segment but not based on the second control data segment to enable blind decoding attempts by devices configured for demodulation at the first order and by devices configured for demodulation at the first and second orders.

4. The method of claim 1, wherein the error detection code is a Cyclic Redundancy Check (CRC) code scrambled with a Radio Network Temporary Identifier (RNTI) of the wireless communication device.

5. The method of claim 1, wherein the second control data segment includes a different error detection code.

6. The method of claim 1 further comprising sending a modulation order indication to the wireless communication device indicating the second order.

7. The method of claim 6, wherein the modulation order indication is sent included in one of the first control data segment and an upper layer signaling message.

8. The method of claim 1, wherein the wireless communication system is or evolves from a Long Term Evolution, LTE, system, wherein the control channel is one of a Physical Downlink Control Channel (PDCCH) and an enhanced PDCCH (ePDCCH), wherein the first and second control data segments are Downlink Control Information (DCI) segments, wherein the first layer is recoverable via Quadrature Phase Shift Keying (QPSK) demodulation, and wherein the second layer is recoverable Via M-QAM demodulation, where M is greater than 4.

9. A radio network node configured for transmitting control data to a wireless communication device in a wireless communication system that includes a control channel over which control data is transmitted, the radio network node comprising circuitry containing instructions which, when executed, cause the node to:
generate first and second control data segments for the wireless communication device, the first control data segment including an error detection code generated based on an identifier of the wireless communication device;
encode each of the first and second control data segments independently and concatenating the first control data segment with the second control data segment;
modulate the first and second control data segments to form one or more multi-layer symbols with a first layer conveying the first control data segment and a second layer conveying the second control data segment, the first layer being recoverable via demodulation at a first order and, the second layer being recoverable via demodulation at a second order higher than the first order; and
transmit the one or more multi-layer symbols to the wireless communication device over the control channel.

10. A method implemented by a wireless communication device for receiving control data from a radio network node in a wireless communication system that includes a control channel over which control data is transmitted, the method comprising:
receiving over the control channel one or more multi-layer symbols conveying a first control data segment in a first layer that is recoverable via demodulation at a first order and conveying a second control data segment in a second layer that is recoverable via demodulation at a second order, higher than the first order, wherein the first control data segment includes an error detection code generated based on a device identifier;
demodulating the first layer at the first order to obtain first-order demodulated data;
determining if the first-order demodulated data is intended for the wireless communication device based on an identifier of the wireless communication device; and
if the first-order demodulated data is intended for the wireless communication device, recovering one or more of the first and second control data segments.

11. The method of claim 10, wherein recovering the second control data segment comprises determining the second order from a received modulation order indication, and demodulating the second layer at the second order based on the modulation order.

12. The method of claim 10, wherein recovering the second control data segment comprises:
demodulating the second layer at the second order to obtain second-order demodulated data; and
recovering the second control data segment from the second-order demodulated data.

13. The method of claim 10, further comprising concatenating the first and second control data segments recovered to form a control data message intended for the wireless communication device.

14. The method of claim 10, wherein the demodulating and determining is for an attempt to blindly decode the first-order demodulated data to recover the first control data segment based on the wireless communication device identifier.

15. The method of claim 10, wherein the determining comprises performing an error detection cheek of the first-order demodulated data based on the wireless communication device identifier.

16. The method of claim 10, wherein the error detection code included in the first control data segment is generated based on the first control data segment but not based on the second control data segment to enable blind decoding attempts by devices configured for demodulation at the first order and by devices configured for demodulation at the first and second orders.

17. The method of claim 10, wherein the error detection code is CRC code scrambled with an RNTI of the wireless communication device.

18. The method of claim 10, wherein the second control data segment includes a different error detection code.

19. The method of claim 10 further comprising receiving a modulation order indication from the radio network node indicating the second order.

20. The method of claim 19, wherein the modulation order indication is included in one of the first control data segment and an upper layer signaling message.

21. The method of claim 10, wherein the wireless communication system is or evolves from an LTE system, wherein the control channel is one of a PDCCH and an ePDCCH, wherein the first and second control data segments are DCI segments, wherein the first layer is recoverable via QPSK demodulation, and the second layer is recoverable via M-QAM demodulation, where M is greater than 4.

22. A wireless communication device configured to receive control data from a radio network node in a wireless communication system that includes a control channel over which control data is transmitted, the device comprising circuitry containing instructions which, when executed, cause the device to:
receive over the control channel one or more multi-layer symbols conveying a first control data segment in a first layer that is recoverable via demodulation at a first order and conveying a second control data segment in a second layer that is recoverable via demodulation at a second order, higher than the first order, wherein the first control data segment includes an error detection code generated based on a device identifier;

demodulate the first layer at the first order to obtain first order demodulated data;

determine if the first-order demodulated data is intended for tile wireless communication device based on an identifier of the wireless communication device; and if the first-order demodulated data is intended for the wireless communication device, recover one or more of the first and second control data segments.

* * * * *